(12) United States Patent
Miyazaki

(10) Patent No.: US 8,898,335 B2
(45) Date of Patent: Nov. 25, 2014

(54) APPARATUS AND METHOD FOR CALCULATING COMMUNICATION PATHS

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1381 days.

(21) Appl. No.: 12/361,638

(22) Filed: Jan. 29, 2009

(65) Prior Publication Data
US 2009/0228604 A1    Sep. 10, 2009

(30) Foreign Application Priority Data

Mar. 5, 2008    (JP) .................................. 2008-054582

(51) Int. Cl.
| | | |
|---|---|---|
| G06F 15/173 | (2006.01) | |
| H04L 12/721 | (2013.01) | |
| H04L 12/725 | (2013.01) | |
| H04L 12/701 | (2013.01) | |
| H04L 12/715 | (2013.01) | |
| H04L 12/707 | (2013.01) | |

(52) U.S. Cl.
CPC .............. *H04L 45/12* (2013.01); *H04L 45/302* (2013.01); *H04L 45/00* (2013.01); *H04L 45/04* (2013.01); *H04L 45/24* (2013.01)
USPC ....... 709/239; 709/240; 370/351; 370/395.21

(58) Field of Classification Search
CPC ......... H04L 45/00; H04L 45/22; H04L 45/24; H04L 45/302
USPC ....................... 709/240, 239; 370/351, 395.21
See application file for complete search history.

(56) References Cited

U.S. PATENT DOCUMENTS

| | | | |
|---|---|---|---|
| 7,483,387 B2 * | 1/2009 | Guichard et al. ............ | 370/252 |
| 2003/0233474 A1 | 12/2003 | Yamamoto | |
| 2004/0039839 A1 * | 2/2004 | Kalyanaraman et al. ..... | 709/238 |

(Continued)

FOREIGN PATENT DOCUMENTS

| | | |
|---|---|---|
| JP | 2004-23179 | 1/2004 |
| JP | 2004-80211 | 3/2004 |
| JP | 2007-60461 | 3/2007 |

OTHER PUBLICATIONS

Farrel et al., RFC 4655—A Path Computation Eleement (PCE)—Based Architecture, Aug. 2006.*

(Continued)

*Primary Examiner* — Joseph E Avellino
*Assistant Examiner* — James Conaway
(74) *Attorney, Agent, or Firm* — Katten Muchin Rosenman LLP

(57) ABSTRACT

An apparatus for calculating a plurality of end-to-end paths communicably connecting two terminal nodes in a communication network divided into a plurality of areas. The apparatus selects, among the plurality of areas, a first sequence of passage areas to be traversed by a first end-to-end path, and selects, among the first sequence of passage areas, multi-path passing areas each defined as an area to be traversed by two or more end-to-end paths.

The apparatus further calculates two or more intra-area paths for each of the multi-path passage areas, and determines the first end-to-end path by selecting a first intra-area path among the calculated intra-area paths for each of the multi-path passing areas so that the first end-to-end path includes the selected first intra-area paths as a segment thereof and traverses the first sequence of passage areas.

13 Claims, 19 Drawing Sheets

(56) References Cited

U.S. PATENT DOCUMENTS

| | | |
|---|---|---|
| 2007/0047465 A1 | 3/2007 | Kano |
| 2007/0121503 A1* | 5/2007 | Guo et al. ............... 370/230 |
| 2007/0230363 A1* | 10/2007 | Buskens et al. ........... 370/252 |
| 2008/0239958 A1* | 10/2008 | Murray et al. ............. 370/235 |
| 2009/0196184 A1* | 8/2009 | Rajan et al. ............... 370/238 |
| 2010/0146149 A1* | 6/2010 | Vasseur et al. ............ 709/239 |
| 2010/0208741 A1* | 8/2010 | Vasseur .................... 370/400 |
| 2011/0176458 A1* | 7/2011 | Buskens et al. ........... 370/255 |

OTHER PUBLICATIONS

Wright, Inter-Area Routing, Path Selection and Traffic Engineering, Nov. 2003.*

JP. Vasseur, et al. "A Backward Recursive PCE-based Computation (BRPC) procedure to computer shortest inter-domain Traffic Engineering Label Switched Paths" (draft-ietf-pce-brpc-06.txt), Networking Working Group Internet Draft, www.ieft.org, Sep. 4, 2007.

* cited by examiner

APPARATUS AND METHOD FOR CALCULATING COMMUNICATION PATHS

CROSS-REFERENCE TO RELATED APPLICATIONS

This application is based upon and claims the benefit of priority of the prior Japanese Patent Application No. 2008-054582, filed on Mar. 5, 2008, the entire contents of which are incorporated herein by reference.

FIELD

The present invention relates to path calculation on a communication network.

BACKGROUND

In order to calculate paths on a large-scaled network, database sizes in devices arranged in the network and the amount of network information to be exchanged among devices in the network become enormous. For example, with a routing protocol such as OSPF (Open Shortest Path First), in order to manage a detailed topology of the network, the number of nodes arranged in the network is limited up to about 100 nodes. Therefore, in many cases, the network is divided into a plurality of areas to reduce the number of nodes for managing the detailed topology of the network.

FIGS. 19A, 19B, 19C are explanatory diagrams of calculating a path over a plurality of divided areas in a communication network. In an example depicted in FIGS. 19A-19C, the network is divided into three areas 2a, 2b, and 2c, and path calculation and signaling are performed by using a routing protocol.

A path calculating device, defined as a device having a function for path calculation, summarizes information on the area including the path calculating device (the own area), and sends a notification indicating the summarized information to devices existing in areas other than the own area, so that network information is exchanged among devices in the network. In this way, the path calculating device can know the detailed information on the own area and the summarized information on areas other than the own area.

When path calculation is requested, a path calculating device in the area 2a including the start node determines such areas that are traversed by at least one path starting from the start node and reaching the end node, by using the summarized information. Thereafter, starting from the area including the start node toward the area including the end node, a path within an area (hereafter described as "an intra-area path") is calculated for each area of the determined areas on the basis of the detailed information thereon, and the calculated intra-area path of the each area of the determined areas is set by signaling. In the examples of FIGS. 19A-19C, it is assumed that an end-to-end path to be calculated sequentially passes through areas 2a, 2b, and 2c. In the case, an intra-area path within the area 2a is first calculated using the detailed information and an intra-area path 3a is set by signaling, as depicted in FIG. 19B. Subsequently, calculation and signaling of an intra-area path are similarly performed for the area 2b, thereby setting a path 3b, as depicted in FIG. 19C.

The above mentioned calculation of an end-to-end path over a plurality of divided areas in a communication network can be performed by using a Path Computation Element (PCE). In the case of using the PCE, a passage area, which is defined as an area traversed by an end-to-end path to be calculated, is specified by a PCE in the area including the start node (hereafter described as "the start area"), and the PCE of each passage area calculates an intra-area path within the each passage area. That is, the PCE in the area including the end node (hereafter described as "the end area") creates a tree indicative of connectibility among in-area paths with in the own area on the basis of the result of calculating the intra-area paths. Next, from the end area toward the start area a sub-tree that is connectable to the previously created sub-tree is sequentially created for each passage area, on the basis of the result of calculating intra-area paths. Thereafter, the shortest end-to-end path is selected from among end-to-end paths obtained by connecting the created sub-trees, and the selected end-to-end path is set by signaling.

FIG. 20 is an explanatory diagram of a path calculation method of two end-to-end paths using the backward recursive PCE-based computation (BRPC).

As a related path calculation method, backward recursive PCE-based computation (BRPC) is disclosed in the document of Networking Working Group Internet-Draft "A Backward Recursive PCE-based Computation (BRPC) procedure to compute shortest inter-domain Traffic Engineering Label Switched Paths" (draft-ietf-pce-brpc-06.txt). According to the method, as shown in FIG. 20, two end-to-end paths (a first end-to-end path 5 and a second end-to-end path 6) can be calculated. In FIG. 20, PCEs 4a, 4b, 4c, and 4d are provided for areas 2a, 2b, 2c, and 2d, respectively, and each of the two end-to-end paths starts from the start node, passes through four areas 2a, 2b, 2c, and 2d, and reaches the terminal node. For example, calculation of two end-to-end paths can be done by sequentially performing the following steps from (1) to (8) which correspond to (1)-(8) depicted in FIG. 20, respectively.

(1) The PCE 4a provided for the start area 2a requests a path calculation of area 2b to PCE 4b provided for area 2b through which an end-to-end path passes next to the area 2a. At this point, signaling is not performed and operation is limited to reception/transmission of request for calculating an intra-area path.

(2) PCE 4b requests a path calculation to PCE 4c provided for area 2c through which the end-to-end path passes next to area 2b.

(3) PCE 4c performs the similar operation in step (2).

(4) When PCE 4d receives a request for calculating an intra-area path, since PCE 4d is provided for the end area 2d, PCE 4d creates a sub-tree after calculating intra-area paths within the own area (end area 2d). The created sub-tree consisting of intra-area paths each connecting the terminal node with a node connectable to area 4c.

(5) After creating the sub-tree, PCE 4d sends information on the created sub-tree to PCE 4c as a response to the path calculating request from PCE 4c.

(6) PCE 4c calculates intra-area paths within the own area 2c. Then, based on the result of the calculation, PCE 4c creates a sub-tree consisting of intra-area paths each connecting a node connectable to area 2d with a node connectable to area 2b, and send information on the created sub-tree to PCE 4b.

(7) PCE 4b performs the similar operation.

(8) PCE 4a calculates intra-area paths within the own area 2a in response to the information given by PCE 4b, and creates a sub-tree of the own area 2a.

Thereafter, PCE 4a selects an end-to-end path for communicably connecting between the start node and the end node by using the information on the sub-trees created by the PCEs provided for areas 2a to 2d. In this case, not all intra-area paths can be used as a part of a sub-trees to be created. For example, in area 2d, as denoted by a dotted lines in FIG. 20, when there are no resources for connecting the end node with a node connectable to next area 2c, an intra-area path 8 (denoted by a dotted line) cannot be used as a part of a sub-tree to be created.

It is possible to select, from a sub-tree created beforehand, a plurality of intra-area paths each used for a different end-to-end path. For example, an intra-area path used for the end-to-end path 5 and an intra-area path used for the end-to-end path 6 can be selected from the sub-tree 7, as depicted in FIG. 20. Selection of an intra-area path from the sub-tree can be performed on the basis of a cost value which is beforehand assigned to each intra-area path in the sub-tree.

Japanese Laid-open Patent Publication No. 2007-60461 discloses, as a related art of path calculation on a plurality of divided networks, a path setting method using a control node that is connected to a control network for controlling and setting transfer on a transmission network. The control node selects one of the boundary control nodes, as an exit node in the direction of the area in which the end node lies, on the basis of link information of the control network, and determines a path reaching the exit node on the basis of the link information of the transmission network.

Japanese Laid-open Patent Publication No. 2004-80211 discloses a method for setting a backup path not having a shared link with a main path between the start node and the end node by providing the priority among boundary nodes and by keeping collaboration among the area boundary nodes.

Japanese Laid-open Patent Publication No. 2004-23179 discloses a method for calculating an exclusive path with the minimal sum of metrics of two paths when a protection type is (1+1) and further discloses a method for calculating a pair of paths with the minimal metrics on the premise of using the pair of paths ensuring an exclusive backup path against the current path, when the protection type is 1:1 or 1:N.

SUMMARY

According to an aspect of the invention, an apparatus includes a path calculation managing part for managing a path calculation, the path calculation managing part selecting among the plurality of areas a first sequence of passage areas to be traversed by a first end-to-end path, and selecting among the first sequence of passage areas multi-path passing areas each defined as an area to be traversed by two or more end-to-end paths. The apparatus further includes an intra-area path calculating part for calculating an intra-area path defined as a communication path communicably connecting two different boundary nodes within an area, the intra-area path calculating part calculating two or more intra-area paths for each of the multi-path passage areas. The path calculation managing part determines the first end-to-end path by selecting a first intra-area path among the calculated two or more intra-area paths for each of the multi-path passage areas so that the first end-to-end path includes as a segment thereof the selected first intra-area path and traverses the first sequence of passage areas.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

Figure 19A:
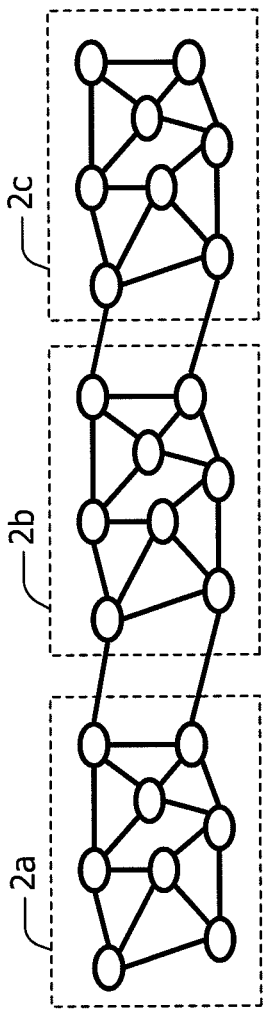
FIGS. 19A-19C are explanatory diagrams of calculating end-to-end paths over a plurality of divided areas in a communication network.
Figure 19B:
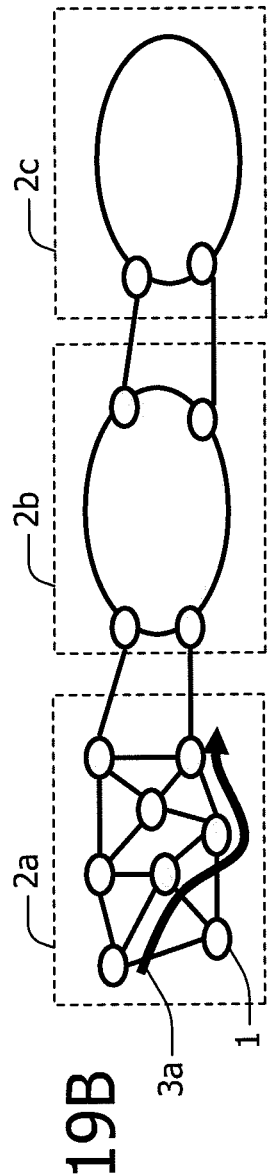
Figure 19C:
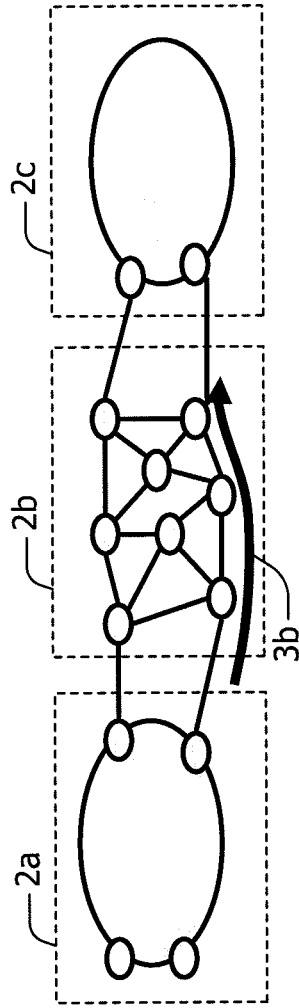
Figure 20:
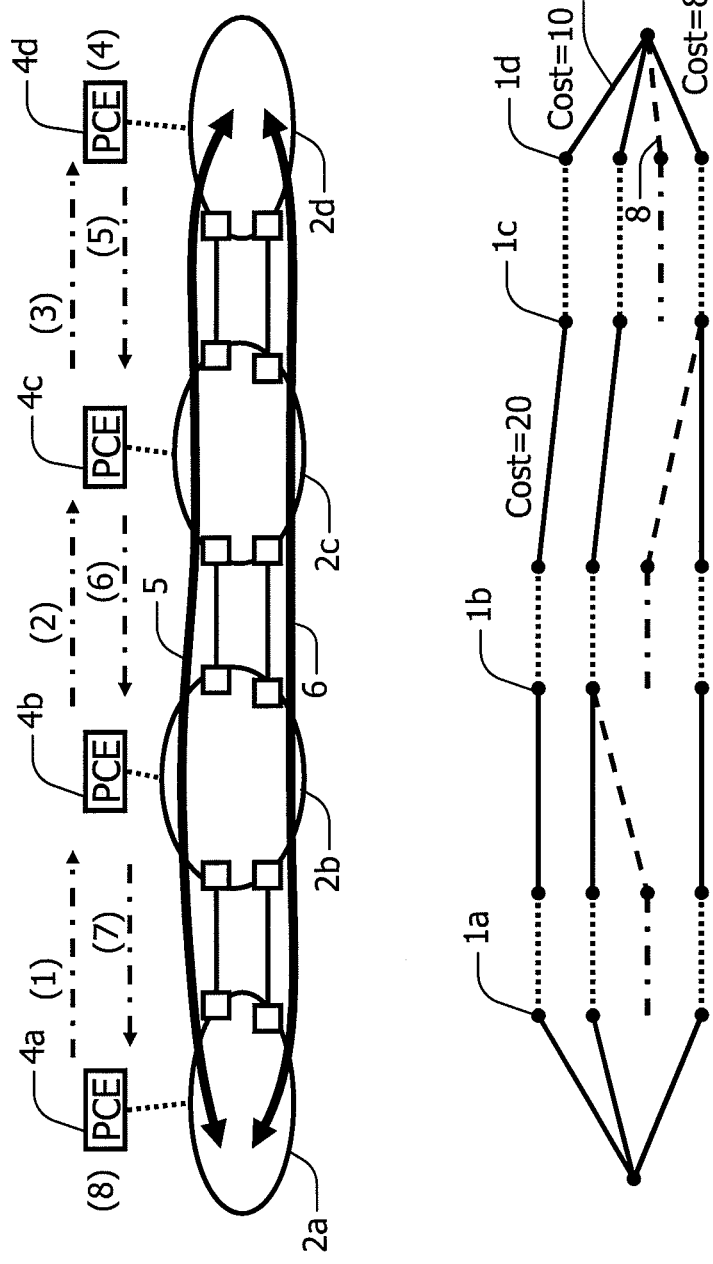
FIG. 20 is an explanatory diagram of calculating two end-to-end paths by using a BRPC.

Summarized information made by a path calculating device varies depending on a summarizing method used by the path calculating device, and does not include detailed information on usage state of resources in each area. Therefore, for example, even if a protection path is set in an area, protection information of the area may not be notified to a device (or node) in areas other than the own area (the area including the path calculating device). In the case, a device in areas other than the own area may not correctly determine resources available therefor by referring to the summarized information only. Therefore, according to the path calculation method depicted in FIG. 19A-19C, even if a path calculation and a path setting by signaling are successful for each area from the start area to an area on the way to the end area, a path calculation for the next area may fail due to shortage of resources. In this case, an end-to-end path for connecting the start node to the end node cannot be set, and a re-calculation of an end-to-end path will be needed. That is, according to the path calculation method explained with reference to FIGS. 19A-19C, even if settings of paths as to some areas in the whole areas to be traversed by an end-to-end path have completed, the calculation of the end-to-end path may fail, and all the intra-area paths need to be re-calculated sequentially for each area from the start area including the start node to the end area including the end node, thereby reducing efficiency of calculation of an end-to-end path.

In the case of using PCE or BRPC, sub-trees are created for all the areas from the start area to the end area, starting from the end area. After selecting an end-to-end path by connecting the created sub-trees, the end-to-end path is set by signaling. Therefore, it may not occur that re-calculation of an end-to-end path is performed due to the shortage of resources after setting paths on the way to the end-to-end path as in the case of using the method described above with reference to FIG. 19.

Figure 21:
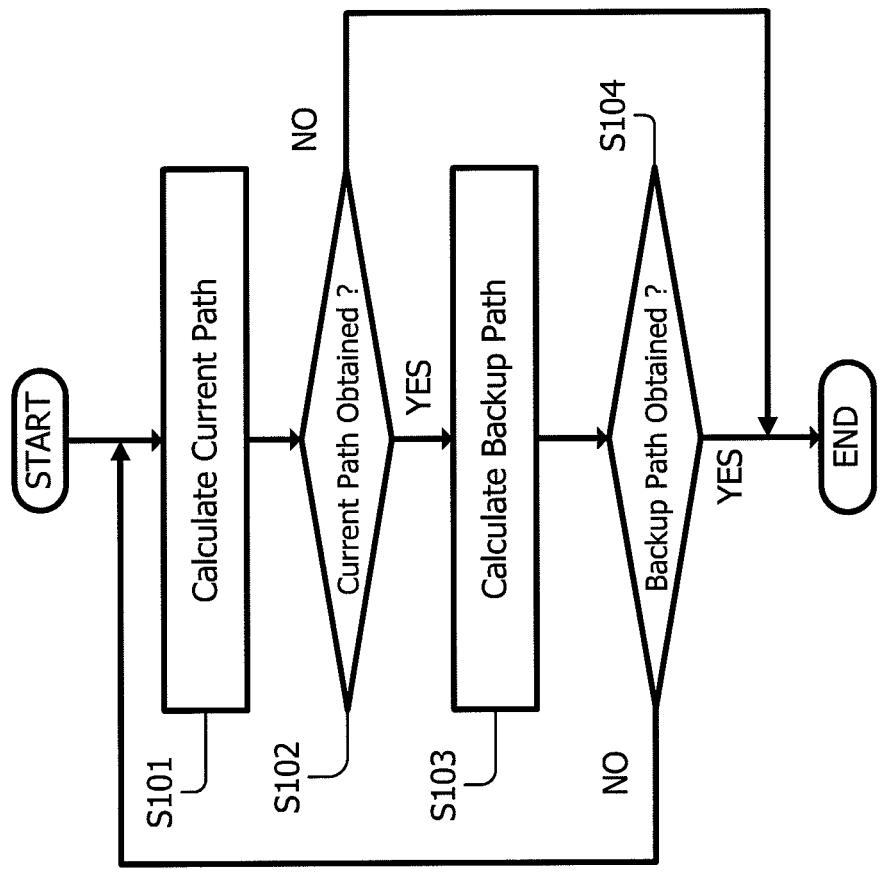
FIG. 21 is an explanatory diagram of calculating end-to-end paths by using a path computation element (PCE).

As depicted in FIG. 21, in the case of determining a plurality of end-to-end paths by calculating an end-to-end path using PCE, a first end-to-end path 5 such as a current path is firstly calculated (in step S101). And after the first end-to-end path 5 is obtained (YES in step S102), calculation of the second end-to-end path 6 such as a backup path is performed (in step S103). When the second end-to-end path 6 is not obtained (NO in S104), processing returns to step S101 to re-calculate the first end-to-end path 5. Herein, since path calculation of PCE 4 is not performed on the premise that a plurality of paths may be set in the network, an end-to-end path other than the end-to-end path calculated as the first end-to-end path 5 may not be ensured. In the case, in order to ensure a plurality of end-to-end paths, it is necessary to re-calculate the first end-to-end path 5, thereby reducing efficiency of calculating an end-to-end path.

In the case of calculating an end-to-end path by using the BRPC, it is possible to simultaneously calculate a plurality of intra-area paths in the same area, enabling efficient calculation of an end-to-end path. However, the BRPC has a restriction that a first end-to-end path 5 and a second end-to-end path 6 can be independently obtained only if both the first end-to-end path 5 and the second end-to-end path 6 pass through the same area from the start node to the end node. Therefore, in order to independently obtain a plurality of end-to-end paths, when at least one of the plurality of end-to-end paths passes through at least one area different from areas traversed by other end-to-end paths, each of the end-to-end paths need to be sequentially calculated one by one.

Hereinafter, a detailed description will be given of embodiments with reference to the drawings.

[Outline of Path Calculation]

Figure 1:
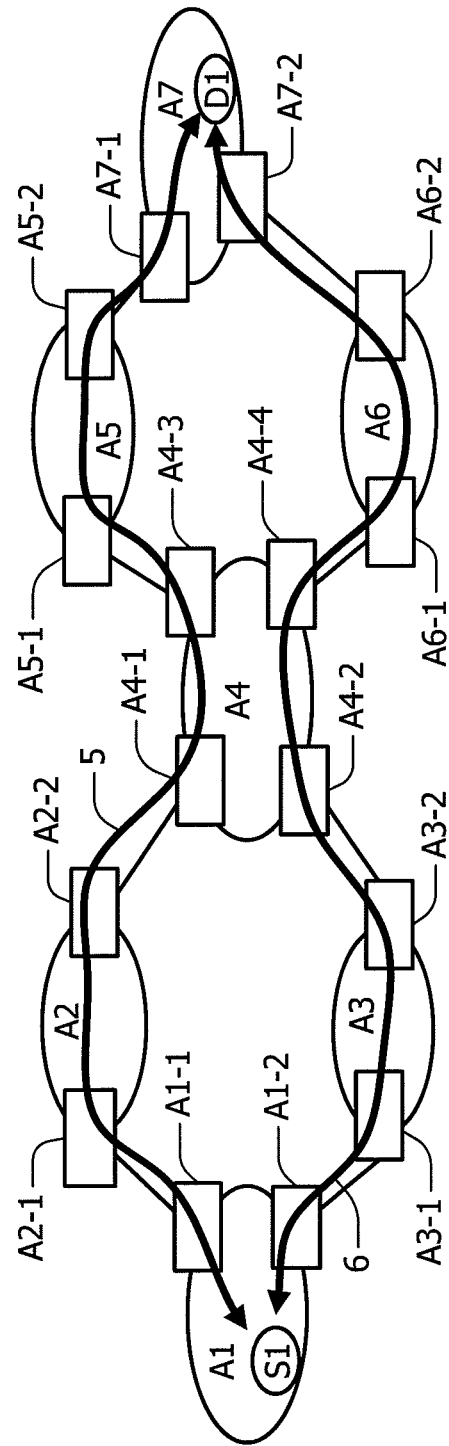
FIG. 1 is a diagram illustrating an example of a communication network divided into a plurality of areas and a plurality of end-to-end paths.

FIG. 1 is a diagram illustrating an example of a communication network divided into a plurality of areas traversed by a plurality of end-to-end paths. In the example depicted in FIG. 1, two end-to-end paths (a first end-to-end path 5 and a second end-to-end path 6) for connecting a start node S1 and an end node D1 are calculated and provisioned on a communication network including seven divided areas A1, A2, A3, A4, A5, A6, and A7.

Hereinafter, a description will be given of outline of calculating a plurality of end-to-end paths according to an embodiment, by taking as an example the case of calculating first and second end-to-end paths 5 and 6 in the communication network depicted in FIG. 1.

As a prerequisite for a path calculation according to the embodiment, it is assumed that summary information on areas A1 to A7 is notified to devices (or nodes) in the other areas. Therefore, a device in an area has detailed information on the own area where the device lies and summary information on areas other than the own area. Herein, it is assumed that link information including area IDs and boundary node IDs is exchanged among the areas as summary information.

Hereinafter, an outline of a path calculation process according to the embodiment is described by the following process steps (1) to (14).

(1) A path calculating device in the start area A1 specifies areas to be traversed by an end-to-end path from the start node S1 to the end node D1 (hereafter expression "passage area" will be also used for the area), as to a first end-to-end path 5 and a second end-to-end path 6, by using the summary information. Hereinafter, a sequence of passage areas to be traversed by a first end-to-end path is expressed as "a first sequence of passage areas", and a sequence of passage areas to be traversed by a second end-to-end path is expressed as "a second sequence of passage areas". Accordingly, a first sequence of passage areas and a second sequence of passage areas are specified as to a first end-to-end path 5 and a second end-to-end path 6, respectively. In the example depicted in FIG. 1, the first end-to-end path 5 is an end-to-end path traversing areas A1, A2, A4, A5, and A7, and the second end-to-end path 6 is an end-to-end path traversing areas A1, A3, A4, A6, and A7. Herein, as a method for specifying passage areas, an arbitrary known path calculation method can be employed.

(2) The path calculating device in the start area A1 checks IDs of areas traversed by the first end-to-end path 5 and the second end-to-end path 6, thereby examining whether or not there exists the same passage area through which both the first end-to-end path 5 and the second end-to-end path 6 pass. When both the first end-to-end path 5 and the second end-to-end path 6 pass through the same passage area, the same passage area is extracted as a multi-path passage area. Herein, "a multi-path passage area" means an area traversed by a plurality of end-to-end paths.

(3) The path calculating device of the start area A1 transmits a message requesting a path calculation of the first end-to-end path 5 to a path calculating device of the adjacent area A2. At this time, the message requesting a path calculation includes information on the passage areas A1, A2, A4, A5, and A7 and information on the multi-path passage areas A1, A4, and A7.

(4) The path calculating device of the area A2 that received the message requesting a path calculation transfers the received message to a path calculating device in area A4 which is a passage area next to the area A2. As for the path calculating devices of areas A4 and A5, the same operation as described above is performed, and the message requesting a path calculation is transmitted to a path calculating device in area A7.

(5) The path calculating device in the end area A7 receives the message requesting a path calculation, and then calculates intra-area paths within the own area A7 by using the detailed information on the own area A7. At this time, since area A7 is a multi-path passage area, two intra-area paths for a first end-to-end path 5 and a second end-to-end path 6 need to be ensured. Therefore, the path calculating device specifically calculates a second intra-area path to be used for the second end-to-end path 6 while calculating a first intra-area path to be used for the first end-to-end path 5. Hereinafter, an intra-area path in the multi-path passage area to be used for a first end-to-end path is expressed as "a first intra-area path", and an intra-area path in the multi-path passage area to be used for a second end-to-end path is expressed as "a second intra-area path".

(6) The path calculating device of the area A7 writes the calculation results of the two intra-area paths for the first end-to-end path 5 and the second end-to-end path 6 into a path calculation response message, and transmits the path calculation response message to the path calculating device of the area A5 through which the first end-to-end path 5 passes. Upon receiving the path calculation response message, the path calculating device of the area A5 calculates the detailed intra-area paths of the area A5. In the case, since only the first end-to-end path 5 passes through the area A5, only one intra-area path for the first end-to-end path 5 is calculated.

(7) The result of calculating an intra-area path within the area A5 by the path calculating device is additively written into the path calculation response message which is transmitted to the path calculating device of the area A4. The path calculation similar to that as to the area A7 and A5 is performed as to the areas A4, A2, and A1. In the case, since the areas A1 and A4 are multi-path passage areas, two intra-area paths for both the first end-to-end path 5 and the second end-to-end path 6 are calculated as to the areas A1 and A4, and only one intra-area path for the first end-to-end path 5 is calculated as to the area A2.

(8) At this point, the path calculating device of the area A1 (the start area) has the results of calculating intra-area paths within the areas A2, A4, A5, and A7 together with the result of calculating intra-area paths within the own area A1. Then, the path calculating device of the area A1 checks whether or not the first end-to-end path 5 from the start node S1 to the end node D1 is obtained in such a manner that all the intra-area paths used for the first end-to-end path 5 are specific within the areas A2, A4, A5, and A7. When calculation of the end-to-end path 5 from the start node S1 to the end node D1 fails, the steps from (1) to (8) are performed again.

(9) When the calculation of the first end-to-end path 5 is completed successfully, the second end-to-end path 6 is subsequently calculated. The path calculating device of the area A1 transmits a path calculation requesting message for calculating the second end-to-end path 6 to areas through which the second end-to-end path 6 passes. In the case, the path calculation requesting message includes information on the areas A1, A3, A4, A6, and A7 through which the second end-to-end path 6 passes and information on the multi-path passage areas A1, A4, and A7. In the multi-path passage areas, calculations of second intra-area paths used for the second end-to-end path 6 are not necessary since the second intra-area paths for the second end-to-end path 6 have been already calculated when the first end-to-end path 5 was calculated. Therefore, the path calculation requesting message is substantially used as a message that requests a path calculation as to areas except for the multi-path passage areas.

(10) Similarly to the first end-to-end path 5, upon receiving a path calculation message, a path calculating device transmits the path calculation requesting message to a path calculating device of an area next in the order of areas through which the second end-to-end path 6 passes. Upon receiving the path calculation requesting message, the path calculating device in the area A7 including the end node D1 does not calculate intra-area paths within the own area A7 since the own area A7 is a multi-path passage area, and then transmits a path calculation response message to the area A6.

(11) Since the area A6 is not a multi-path passage area, in response to the path calculation response message, the path calculating device of the area A6 calculates an intra-area path within the area A6 and writes the result of the path calculation into the path calculation response message which is transmitted to the area A4. The path calculating device of the area A4 transmits the path calculation response message to the area A3, and the path calculating device of the area A3 writes the result of calculation of an intra-area path within the area A3 into the path calculation response message which is transmitted to the start area A1.

(12) The path calculating devise of start area A1 checks whether or not the second end-to-end path 6 is obtained in such a manner that all the intra-area paths within the areas through which the second end-to-end path 6 passes are specific, on the basis of information on the second intra-area paths that were calculated for the multi-path passage areas when calculating the first end-to-end path 5 and were not used for the first intra-area paths, and on the basis of information on the intra-area paths path notified from the areas A3 and A6 which are not multi-path passage areas.

(13) When the calculation of the second end-to-end path 6 has failed, re-calculation from the step (1) is performed so as to re-calculate both the first end-to-end path 5 and the second end-to-end path 6.

(14) When the first end-to-end path 5 and the second end-to-end path 6 have been obtained, each of the obtained end-to-end paths (the first end-to-end path 5 and the second end-to-end path 6) are set by performing signaling along each of the obtained end-to-end paths from the start node S1 to the end node D1, and.

As mentioned above, in the case, the path calculating devise of start area A1 is described as a first path calculating device that selects among the plurality of areas a first sequence of passage areas to be traversed by a first end-to-end path, and selects, among the first sequence of passage areas, multi-path passage areas each defined as an area to be traversed by two or more end-to-end paths. And the path calculating device of an area other than the start area is described as a second path calculating device that calculates an intra-area path defined as a communication path communicably connecting two different boundary nodes within an area, and calculates two or more intra-area paths for each of the multi-path passage areas.

In the above description, for convenience of explanation, the path calculating devise of start area A1 is described as a first path calculating device, that is, a device for specifying areas through which an end-to-end path passes and specifying multi-path passage areas. Another device different from he path calculating devise of start area A1 can be configured to be a first path calculating device that specifies passage areas through which an end-to-end path passes. In the case, another device that specifies the passage areas transmits the specified information to second path calculating devices that receive a message requesting a path calculation.

As mentioned above, in a multi-path passage area through which a plurality of end-to-end paths pass, a first intra-area path is calculated on the premise that a plurality of end-to-end paths pass through the multi-path passage area. Therefore, it is possible to avoid the shortage of resources that may arise from selecting, in the multi-path passage area, an intra-area path best for only one end-to-end path (for example, the end-to-end path 5) without considering other end-to-end paths which may pass through the same multi-path passage area. As will be described later, in the case of calculating intra-area paths within an area, it is possible to impose limiting conditions such as "node independence" or "link independence" by using a known path calculation algorithm. As a result, for example, even when two end-to-end paths (a first end-to-end path 5 and a second end-to-end path 6) pass through different areas, the two end-to-end paths can be calculated independently. Further, since setting of end-to-end paths by signaling is performed after obtaining both the first end-to-end path 5 and the second end-to-end path 6, it is improbable to fail in calculating end-to-end paths after setting a portion of the end-to-end paths. Therefore, setting of the two end-to-end paths by signaling can be performed without fail.

[Outline of Path Calculating Device]

Figure 2:
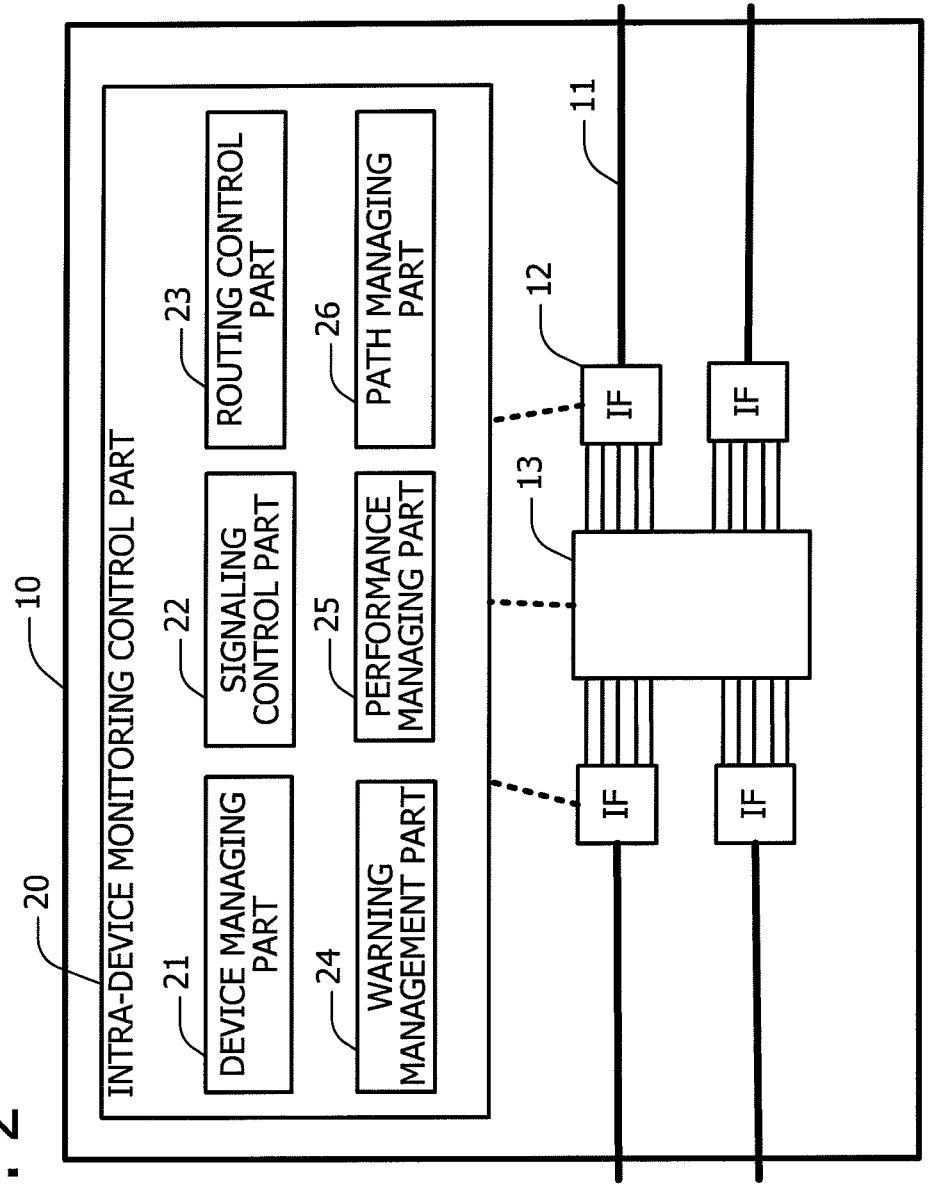
FIG. 2 is a diagram illustrating an example of a structure of a path calculating device according to an embodiment.

FIG. 2 is a diagram illustrating an example of a structure of a path calculating device according to an embodiment.

A path calculating device 10 comprises: a line 11; an interface part (IF) 12; a switch part 13 and an intra-device monitoring control part 20. A path calculation part for calculating paths is also called a path computation element (PCE), and is included in a routing control part 23 of the intra-device monitoring control part 20. The path calculation part will be specifically described later. Depending on the connection environment and the using situation of the path calculating device 10, the structures of the line 11, interface part 12, and switch part 13 can be modified. However, the structure of the intra-device monitoring control part 20 basically is invariant. The interface part 12 connects the switch part 13 to another device, and transmits/receives a signaling message to/from another node in accordance with instructions of the intra-device monitoring control part 20. Further, the switch part 13 is used for setting a path, that is, after calculating an end-to-end path, the setting of the calculated end-to-end path can be performed by changing the setting of switch part 13.

The intra-device monitoring control part 20 manages and controls the path calculating device 10. The intra-device monitoring control part 20 comprises: a device managing part 21; a signaling control part 22; a routing control part 23; a warning managing part 24; a performance managing part 25; and a path managing part 26. The path calculation part for calculating a path can be realized as a hardware circuit comprising a plurality of portions, as described later with reference to FIG. 3, or can be realized by software that uses functions provided for portions included in the routing control part 23.

The device managing part 21 controls the whole of the path calculating device 10. The signaling control part 22 controls a signaling message received and transmitted by the path calculating device 10. The routing control part 23 controls a routing function provided for the path calculating device 10. The warning managing part 24 monitors failures of transmission paths, controls the activation and suppression of warning, and performs setting and change of the importance of warning. The performance managing part 25 executes controls regarding performance information such as recording, changing, and updating of the performance information. The path managing part 26 manages the path state, and has a database that records states of paths as necessary. The signaling control part 22 and the routing control part 23 can be configured to be a device separate from the path calculating device 10, that is, can be configured to be connectable/disconnectable to the path calculating device 10. Each part in the intra-device monitoring control part 20 can be realized, for example, by a hardware circuit. Also, a portion of or all of the functions of those parts may be realized as software.

Figure 3:
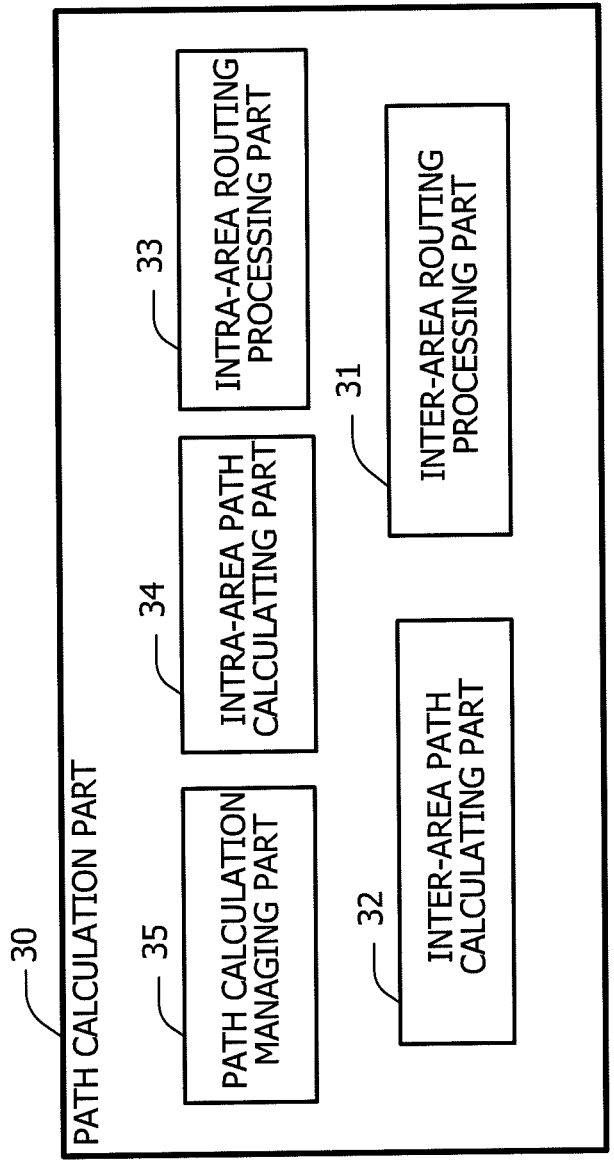
FIG. 3 is a diagram illustrating an example of a structure of a path calculation part in a path calculating device according to an embodiment.

FIG. 3 is a diagram illustrating an example of a structure of a path calculation part in a path calculating device according to an embodiment.

A path calculation part 30 is included in the routing control part 23 and comprises: an inter-area routing processing part 31; an end-to-end path calculating part 32; an intra-area routing processing part 33; an intra-area path calculating part 34; and a path calculation managing part 35.

The inter-area routing processing part 31 exchanges, among areas, link information (such as TE Link and Traffic Engineering Link) and summary information on other area by using a routing protocol such as OIF E-NNI routing protocol (Optical Internetworking Forum External Network Node Interface). Further, the inter-area routing processing part 31 has a memory and stores therein information obtained by exchanging information among areas so as to provide the stored information for other parts as necessary. For example, summary information on the seven areas (areas A1 to A7) depicted in FIG. 1 is exchanged among inter-area routing processing parts 31 included in the path calculating devices 10 that manage respective areas, and the exchanged summary information is stored in the memories of the respective inter-area routing processing parts 31.

Summary information varies depending on a method of summarizing information on an area. For example, even if summary information includes only information on inter-area links, the summary information can be configured so that one or more pieces of information such as a boundary node ID, an area ID, and an available bandwidth are exchanged among areas. Further, a link can be virtually created between two boundary nodes that belong to different areas respectively and can be connected each other, and information on the created virtual link can be exchanged among areas. For example, if node A1-1 of the area A1 in FIG. 1 can be connected to node A2-1 of the area A2 adjacent to the area A1, a virtual link between nodes A1-1 and A2-1 can be created, and information on the created virtual link can be exchanged together with information on inter-area links. In the case, information to be exchanged can be configured to include, for example, information on connection of the virtual link, information on connectivity and available bandwidth of the virtual link, or detailed information of the virtual link in addition to the information on the connectivity and the available bandwidth thereof.

The inter-area path calculating part 32 selects a sequence of passage areas to be traversed by an end-to-end path by using the information regarding areas held by the inter-area routing processing part 31. For example, in the case of FIG. 1, two sequences of areas traversed by the first end-to-end path 5 and the second end-to-end path 6 pass are selected. For example, as for the end-to-end path 5, the sequence of passage areas: A1, A2, A4, A5, and A7 are selected. The inter-area path calculating part 32 selects a sequence of passage areas by using summary information on the areas A1 to A7 stored in the inter-area routing processing part 31.

When information on boundary nodes of each area is given as summary information, the inter-area path calculating part 32 can output ID information of nodes which are located at the boundary of the searched passage area. Further, the inter-area path calculating part 32 can be configured to have a storage region for storing the result of calculating intra-area paths, if required.

The intra-area routing processing part 33 exchanges link information (TE Link) in areas by using a routing protocol such as OSPF-TE (Open Shortest Path First-Traffic Engineering) or Integrate IS-IS (Integrate Intermediate System-to-Intermediate System). Further, the intra-area routing processing part 33 has a storage function for storing the obtained information, and provides the stored information to the intra-area path calculating part 34, as necessary.

The intra-area path calculating part 34 calculates the intra-area path within the own area on the basis of topology information on the own area which is collected by the intra-area routing processing part 33. That is, the details of an intra-area path within the area, such as nodes through which the intra-area path passes and the order in which the intra-area path passes, are determined. As a method for calculating an intra-area path, a known method for calculating paths, such as a k-shortest path algorithm, can be employed. However, it is preferable to use an algorithm capable of calculating a plurality of paths at once. Further, the intra-area path calculating part 34 can be configured to request the intra-area routing processing part 33 to send topology information.

The path calculation managing part 35 controls path calculation executed by the path calculating device 10 and manages the distribution of processing to other parts by the path calculation part 30. For example, when the path calculating device 10 calculates intra-area paths in its own area, the path calculation managing part 35 recognizes that calculation of intra-area paths should be performed, and requests the intra-area path calculating part 34 to perform calculation of intra-area paths. Further, the path calculation managing part 35 can be configured to instruct the intra-area routing processing part 33 to transmit information necessary for the path calculation to the intra-area path calculating part 34.

Further, the path calculation managing part 35 determines, on the basis of the result of path calculation included in the path calculation response message 50, whether or not the first end-to-end path 5 and the second end-to-end path 6 are obtained. As mentioned above, the determination can be performed, in many cases, by the device existing in the start area, such as the start node S1. Alternatively, a path calculation managing part 31 at a node other than the start node can be configured to perform the above determination.

Further, the path calculation managing part 35 can be configured to have a path determining part which determines an end-to-end path, such as the first end-to-end path 5 and the second end-to-end path 6, on the basis of the result of the path calculation.

The path calculation managing part 35 also specifies multi-path passage areas by using a sequence of passage areas selected by the inter-area path calculating part 32. Herein, the path calculation managing part 35 can be configured to include a multi-path passage area specifying part which specifies a multi-path passage area to be traversed by a plurality of end-to-end paths.

The structure of the path calculation part 30 is not limited to the foregoing configuration, and can be varied depending on embodiments of the path calculating device 10. For example, the inter-area routing processing part 31 and the inter-area path calculating part 32 can be integrated into an inter-area path calculation processing part 36. Similarly, the intra-area routing processing part 33, the intra-area path calculating part 34, and the path calculation managing part 35 can be integrated into an intra-area path calculation processing part 37.

[First Embodiment Of Path Calculation]

Hereinafter, a detailed description will be given of an example of the path calculation according to a first embodiment.

First, a description will be given of an operation of the path calculation part 30 upon calculating the first end-to-end path 5.

Figure 4A:
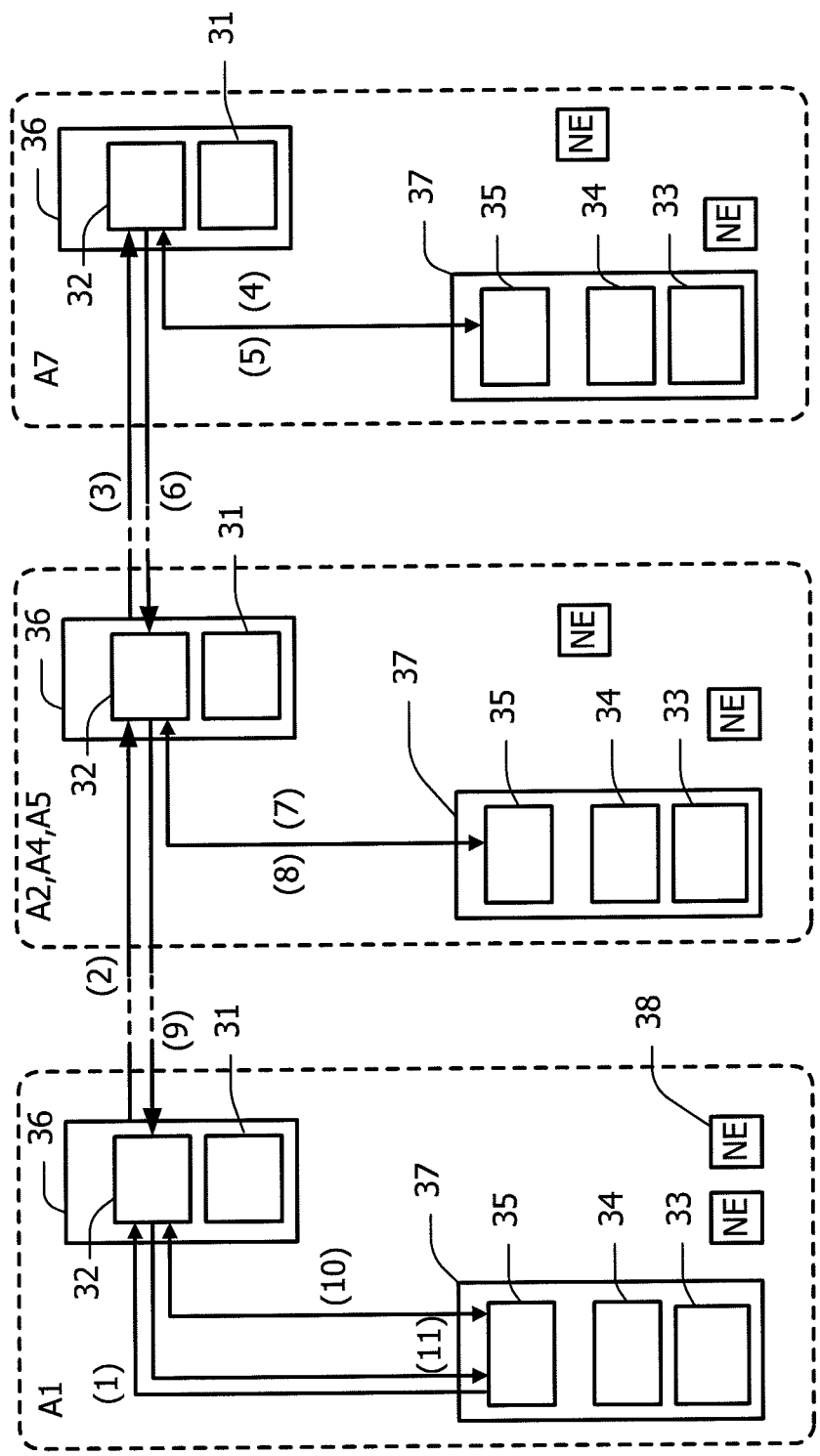
FIGS. 4A and 4B are explanatory diagrams of an operation performed by the path calculation part according to a first embodiment.
Figure 4B:
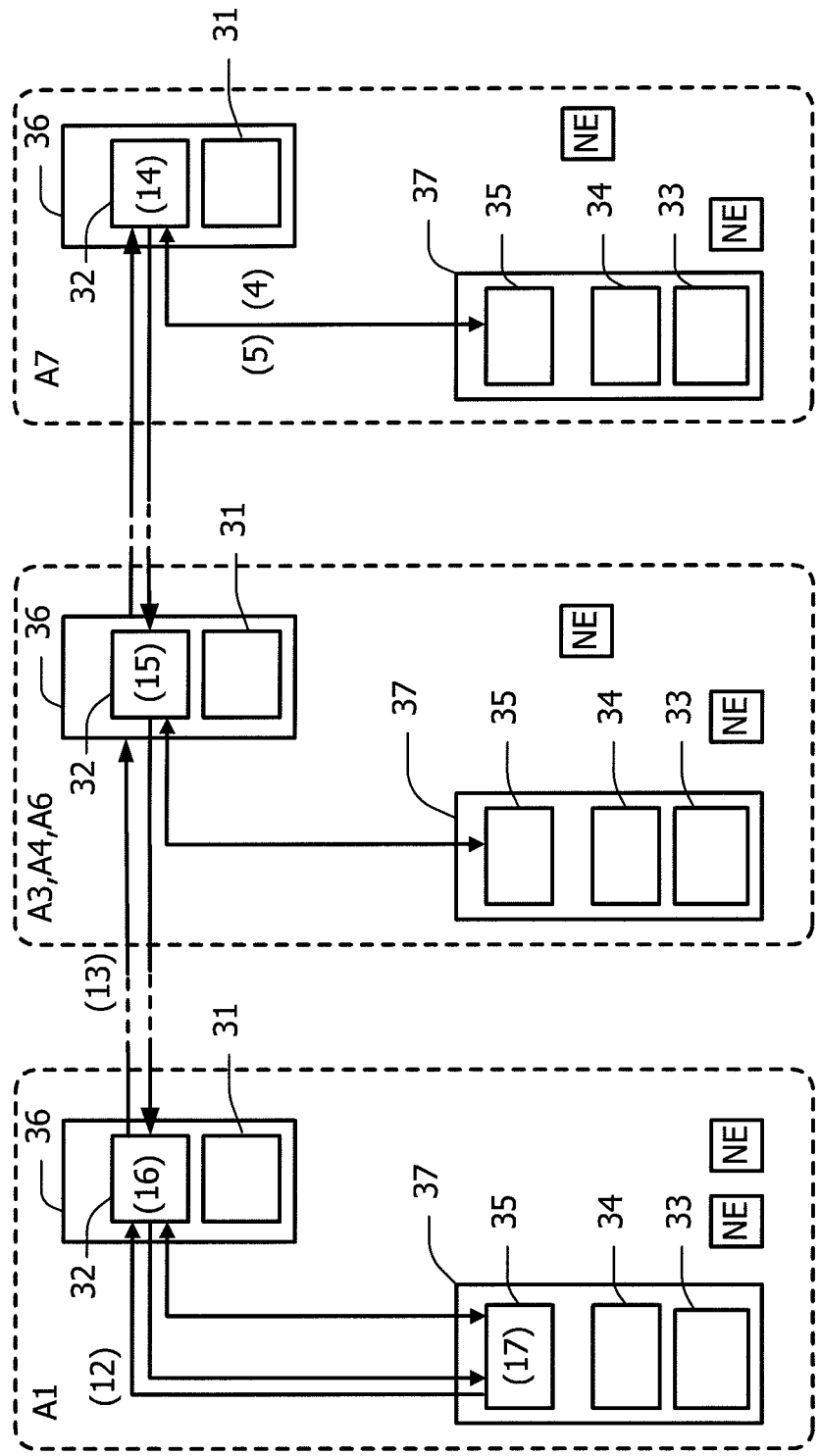

FIGS. 4A and 4B are explanatory diagrams of an operation performed by the path calculation part according to an embodiment. FIG. 4A illustrates the areas A1, A2, and A7 in the network of FIG. 1. Further, in the case, the inter-area path calculation processing part 36 and the intra-area path calculation processing part 37 are each included in different devices. Since not all the nodes existing in an area have a path calculation function, a node not having the path calculation function is expressed as a network element (NE) 38.

For example, calculation of the end-to-end path 5 can be done by sequentially performing the following steps from (1) to (11) which correspond to (1)-(11) depicted in FIG. 4A, respectively.

(1) The inter-area routing processing part 31 in the area A1 exchanges summary information with the inter-area routing processing part 31 included in the inter-area path calculation processing part 36 in the area A2 different from the own area A1. By using the exchanged summary information, the inter-area path calculating part 32 provided for the path calculating device 10 in the start area A1 selects a sequence of passage areas traversed by an end-to-end path from the start node S1 to the end node D1, as to each of the first end-to-end path 5 and the second end-to-end path 6.

Thereafter, the path calculation managing part 35 extracts multi-path passage areas through which a plurality of paths pass by using the above result calculated by the inter-area path calculation part 32, that is, the sequence of passage areas traversed by an end-to-end path from the start node S1 to the end node D1 passes. In the case, the path calculation managing part 35 compares the area IDs of a first sequence of passage areas (the sequence of areas A1, A2, A4, A5, and A7) to be traversed by the first end-to-end path 5 with the area IDs of a second sequence of passage areas (the sequence of areas A1, A3, A4, A6, and A7) to be traversed by the second end-to-end path 6. As a result, the areas A1, A4, and A7 are extracted as the multi-path passage areas. After the extraction of the multi-path passage areas, the path calculation managing part 35 creates a path calculation requesting message, an example of which is depicted in FIG. 5, and sends the message to the inter-area path calculating part 32 to request a path calculation.

Figure 5:
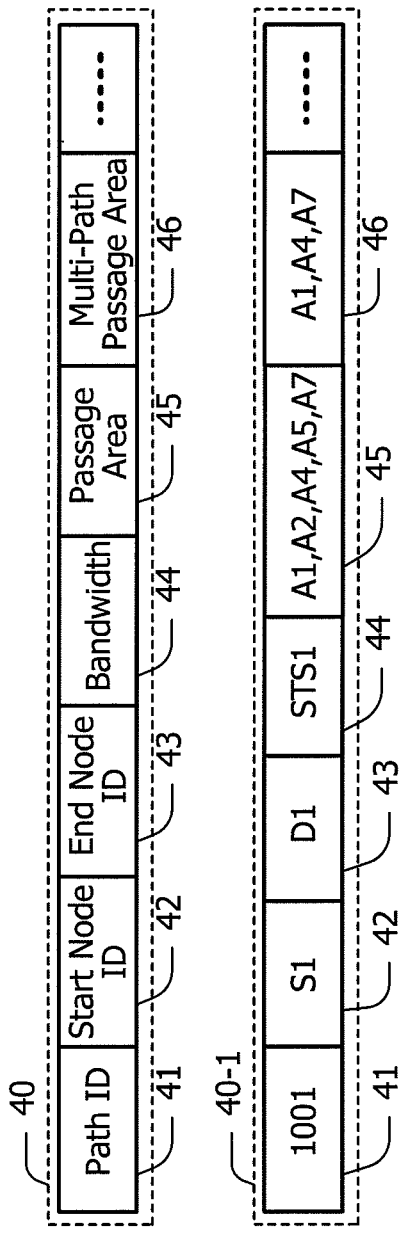
FIG. 5 is a diagram illustrating an example of a path calculation requesting message according to an embodiment.

FIG. 5 is a diagram illustrating an example of a path calculation requesting message according to an embodiment. As depicted in FIG. 5, the path calculation requesting message 40 comprises, for example, path ID 41, start node ID 42, end node ID 43, bandwidth 44, passage area information 45, and multi-path passage area information 46. In FIG. 5, a reference alpha-numeral 40-1 illustrates a sample of a path calculation requesting message requesting calculation of the first end-to-end path 5.

(2) The inter-area path calculating part 32 in the area A1 checks the path calculation requesting message 40 received from the path calculation managing part 35. The area A2 next to the own area A1 is designated in the passage area information 45 of the received path calculation requesting message 40, the area A2 is set as a passage area through which the first end-to-end path 5 passes next to the area A1.

Therefore, the path calculation requesting message 40 is transmitted to the inter-area path calculation processing part 36 in the area A2. In the inter-area path calculation processing part 36 in the area A2, the inter-area path calculating part 32 receives the path calculation requesting message 40 from the area A1.

(3) The inter-area path calculating part 32 in the area A2 transmits the path calculation requesting message 40 to the passage area next to the own area by referring to the passage area information 45 in the received path calculation requesting message 40. With repetition of this step, the path calculation requesting message 40 is transmitted to the inter-area path calculating part 32 in the inter-area path calculation processing part 36 in the area A7 which is the end area.

(4) The inter-area path calculating part 32 of the inter-area path calculation processing part 36 in the end area A7 checks the received path calculation requesting message 40. When it is recognized that the own area is the end area, the inter-area path calculating part 32 request the path calculation managing part 35 included in the intra-area path calculation processing part 37 to calculate intra-area paths within the area A7.

(5) Upon receiving the request of calculating intra-area paths, the path calculation managing part 35 checks, by referring to the multi-path passage area information 46 in the path calculation requesting message 40, whether or not the own area is designated as a multi-path passage area. In the case of FIG. 1, since both the first end-to-end path 5 and the second end-to-end path 6 pass through the end area A7, the area A7 is designated as a multi-path passage area in the multi-path passage area information 46, meaning that two intra-area paths need to be calculated in the area A7. Therefore, the path calculation managing part 35 requests the intra-area path calculating part 34 to calculate two intra-area paths.

The intra-area path calculating part 34 calculates intra-area paths by using the topology information held in the intra-area routing processing part 33. Herein, a well-known method for calculating a plurality of paths, such as k-shortest path algorithm, can be used for the calculation of intra-area paths.

Then, the intra-area path calculating part 34 sends a notification indicating the result of calculation of intra-area paths to the path calculation managing part 35 which next sends the received notification indicating the calculation result to the inter-area path calculating part 32. The inter-area path calculating part 32 extracts boundary nodes from the received result of intra-area path calculation, and stores the extracted boundary nodes as the result of the intra-area path calculation. For example, as depicted in the area A7 of FIG. 1, upon finding an intra-area path from the end node D1 to the boundary node A7-1 and an intra-area path from the end node D1 to the boundary node A7-2, information identifying two pairs of nodes "D1, A7-1" and "D1, A7-2" is stored as information identifying the calculated intra-area paths.

Figure 6:
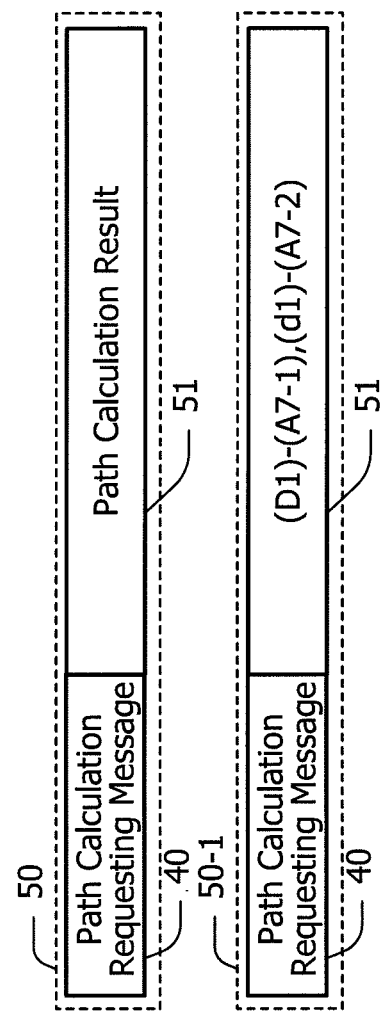
FIG. 6 is a diagram illustrating an example of a path calculation response message according to an embodiment.

(6) The inter-area path calculation processing part 36 in the area A7 creates a path calculation response message 50, which is depicted in FIG. 6, by adding the result of the intra-area path calculation to the path calculation requesting message 40-1. As depicted in FIG. 9, the path calculation response message 50 comprises, for example, a path calculation requesting message 40 depicted in FIG. 5 and a path calculation result 51. The inter-area path calculation processing part 36 in the area A7 transmits the created path calculation response message 50 to the inter-area path calculation processing part 36 in the area A5 through which the first end-to-end path 5 passes. In the case, path calculation response message 50 can be created, for example, as depicted by reference alpha-numeral 50-1 in FIG. 6.

(7) Upon receiving the path calculation response message 50, the inter-area path calculating part 32 of the inter-area path calculation processing part 36 in the area A5 requests the path calculation managing part 35 in the area A5 to calculate intra-area paths within the area A5.

(8) Upon receiving a request for calculating intra-area paths, the path calculation managing part 35 checks, by referring to the path calculation requesting message 40 included in the path calculation response message 50, whether or not the own area is a multi-path passage area. In the case of FIG. 1, since the area A5 is not a multi-path passage area, the path calculation managing part 35 requests the intra-area path calculating part 34 to calculate intra-area paths.

Upon receiving the request for calculating intra-area paths, the intra-area path calculating part 34 calculates an intra-area path within the area A5, and sends a notification indicating the result of intra-area path calculation to the path calculation managing part 35 which next sends the received notification indicating the result of intra-area path calculation to the inter-area path calculating part 32. The inter-area path calculating part 32 extracts boundary node information from the received result of intra-area path calculation, and stores the extracted boundary node information as the result of intra-area path calculation in a manner similar to the step (5).

(9) The inter-area path calculation processing part 36 in the area A5 adds the result of the intra-area path calculation to the field 51 of the path calculation response message 50 received from the area A7 to create a path calculation response message 50. For example, in the area A5, when an intra-area path connecting the boundary node A5-2 with the boundary node A5-1 is found, the field 51 indicative of the result of intra-area path calculation is described as (D1)-(A7-1), (D1)-(A7-2), and (A5-2)-(A5-1). The inter-area path calculation processing part 36 transmits the created path calculation response message 50 to the inter-area path calculation processing part 36 in the area A4 through which the first end-to-end path 5 passes.

As for each of the passage areas A4 and A2 through which the first end-to-end path 5 passes, in a manner similar to the area A5, intra-area paths thereof are calculated and the path calculation response message 50 including the result of intra-area path calculation is transmitted to the next passage area. The path calculation response message 50 is finally transmitted to the inter-area path calculation processing part 36 in the start area A1.

(10) The inter-area path calculation processing part 36 in the start area A1 receives the path calculation response message 50, and then operates in a manner similar to the step (5).

(11) The path calculation managing part 35 in the start area A1 determines the first end-to-end path 5 on the basis of the result of calculating intra-area paths within the area A1 and the information set at the field 51 of the path calculation response message 50 received from the area A2. In the field 51 of the path calculation response message 50, a plurality of intra-area paths are recorded as the result of intra-area path calculation as to each of the multi-path passage areas. Therefore, the path calculation managing part 35 can determine a first intra-area path to be used for the first end-to-end path 5 on the basis of the summary information given to the intra-area routing processing part 33.

In the example described above, as depicted in FIG. 5, an end-to-end path is calculated on the basis of a path calculation requesting message 40 in which passage areas of the end-to-end path 5 and multi-path passage areas are designated by using area IDs. However, as to the second end-to-end path 6, any information on areas other than the multi-path passage areas is not described in the path calculation requesting message 40, that is, information on areas through which the second end-to-end path should pass next to the multi-path passage area is not designated. Therefore, when there are two or more adjacent areas to which the multi-path passage area can connect, calculation of intra-area paths are performed under a condition which are beforehand set on the area. For example, it can be set as the condition that an intra-area path destined for areas in a predetermined direction is preferentially calculated. The setting of the condition can be stored, for example, in the path calculating device 10.

[Path Calculation Under Detailed Conditions]

Although any conditions are imposed on intra-area path calculation for the second end-to-end path 6 in the multi-path passage area in the above-mentioned example, intra-area path calculation can be performed so that the second end-to-end path 6 passes through the designated nodes in the multi-path passage area.

Figure 7:
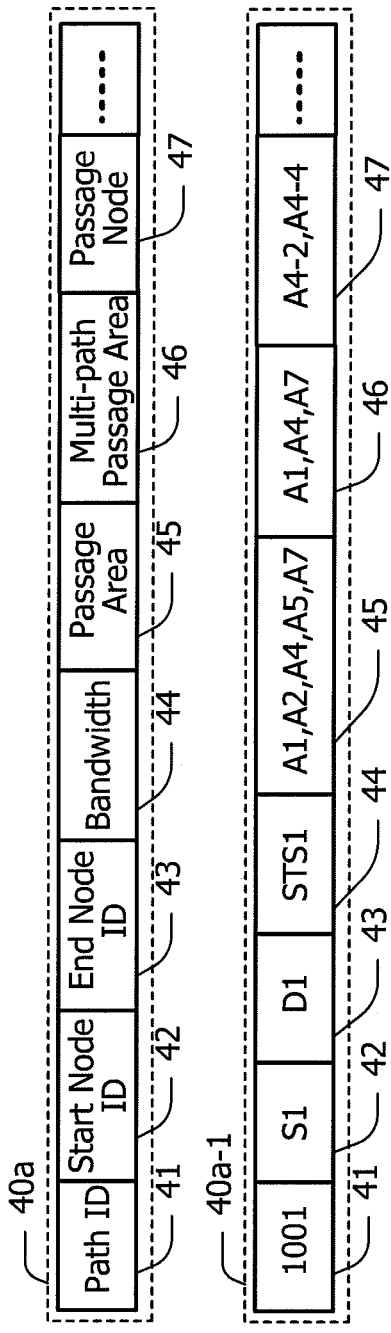
FIG. 7 is a diagram illustrating an example of a path calculation requesting message in which nodes through which an end-to-end path passes are specified, according to an embodiment.

FIG. 7 is a diagram illustrating an example of a path calculation requesting message in which nodes through which an end-to-end path passes are specified, according to an embodiment. In the case, a path calculation requesting message 40a further includes passage node information 47, and the path calculation managing part 35 checks whether there exists or not, in the own area, the node designated by the passage node information 47. For example, in FIG. 7, a reference alpha-numeral 40a-1 indicates an example of the path calculation requesting message 40a including the passage node information 47 where the two nodes A4-2 and A4-4 are set as passage nodes.

When the inter-area path calculating part 32 in the area A4 receives the path calculation response message 50 in response to the path calculation requesting message 40a depicted in FIG. 7, the inter-area path calculating part 32 requests the path calculation managing part 35 to calculate intra-area paths within the area A4. The path calculation managing part 35 checks, by referring to the data held in the intra-area routing processing part 33, whether the nodes A4-2 and A4-4 exist in the area A4. When there exist, in the area A4, nodes designated by the passage node information 47, the path calculation managing part 35 sends the passage node information 47 to the intra-area path calculating part 34 when requesting a calculation of intra-area paths. Upon receiving the passage node information, the intra-area path calculating part 34 searches for an intra-area path that pass through the nodes designated by received passage node information.

Figure 8:
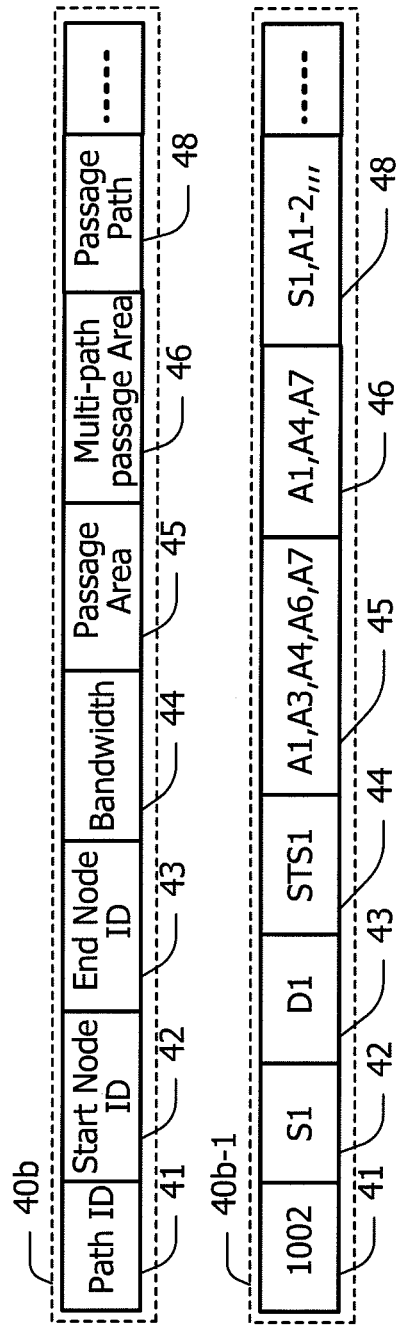
FIG. 8 is a diagram illustrating an example of a path calculating requesting message in which passage paths through which an end-to-end path passes are specified, according to an embodiment.

As for a first end-to-end path 5, intra-area path calculation can be performed by designating nodes through which the first end-to-end path 5 passes by using passage path information 48 which is depicted in a path calculation requesting message 40b of FIG. 8.

FIG. 8 is a diagram illustrating an example of a path calculating requesting message in which passage paths through which an end-to-end path passes are specified, according to an embodiment. In an example 40b-1 in FIG. 8, the passage path information 48 is designated so that the first end-to-end path 5 is calculated to include the intra-area path from the start node S1 to the node A1-2 within the area A1. In the case of designating the passage path information 48, the intra-area path calculating part 34 and the path calculation managing part 35 can be configured to perform the processing similar to the case of designating the passage node information 47.

Further, path calculation can be executed under calculation conditions imposed on end-to-end paths to be calculated. Examples of the calculation conditions include node independence, link independence, and SRLG (Shared Risk Link Group) independence. Herein, the condition of node independence means that different end-to-end paths, such as a first end-to-end path 5 and a second end-to-end path 6, do not pass through the same node, and the condition of link independence means that different end-to-end paths, such as a first end-to-end path 5 and a second end-to-end path 6, do not pass through the same communication link. The condition of SRLG independence indicates that different end-to-end paths, such as a first end-to-end path 5 and a second end-to-end path 6, do not share the communication link having the same risk such as being accommodated in the same conduit line.

Figure 9A:
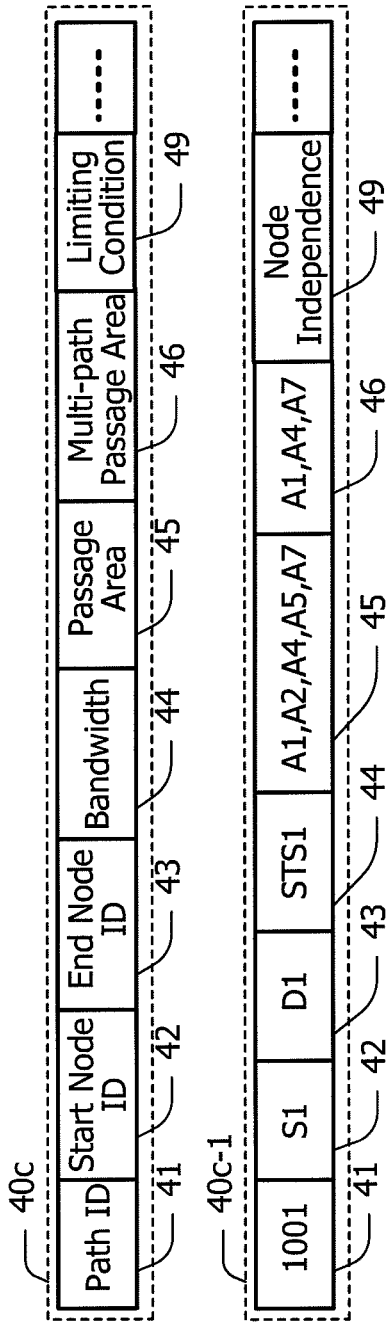
FIG. 9A is a diagram illustrating an example of a path calculation requesting message when calculating end-to-end paths under limiting conditions, according to an embodiment.

These calculation conditions can be set, as the limiting condition 49, in the path calculation requesting message 40c, as depicted in FIG. 9A. An example 40c-1 of the path calculation requesting message 40c, used for the calculation of the first end-to-end path 5, is depicted in FIG. 9A, where node independence is set as the limiting condition 49.

Further, the calculation condition and the priority can be stored before hand in the path calculating device 10 of each area. In this case, if the limiting condition 49 is not set in the path calculation requesting message 40, the condition of the first priority can be taken as a default condition and used for the limiting condition 49.

In the case, the path calculation managing part 35 checks the limiting condition 49 and sends the content thereof to the intra-area path calculating part 34 when requesting the path calculation. The intra-area path calculating part 34 calculates intra-area paths under the condition designated by the limiting condition 49 received from the path calculation managing part 35. The condition path calculation can be set, for example, by using the setting of the k-shortest path algorithm.

By setting the calculation conditions mentioned above, a plurality of end-to-end paths can be calculated in accordance with the intended purpose and the degree of risk.

[Operation of Path Calculation Part Upon Calculating a Second End-to-end Path]

When calculation of the first end-to-end path 5 is successful, a second end-to-end path 6 is calculated. Hereinafter, a detailed description will be given of the operation of the path calculation part 30 upon calculating the second end-to-end path 6, with reference to FIG. 4B. In the following description, it is assumed that the intra-area paths within the multi-path passage area used for the second end-to-end path 6, that is, the second intra-area paths were obtained together with the first end-to-end path 5 when the calculation of the first end-to-end path 5 was performed.

Calculation of the second end-to-end path 6 can be done, for example, by sequentially performing the following steps from (12) to (17) which correspond to (12)-(17) depicted in FIG. 4B, respectively.

(12) When succeeding in calculation of the first end-to-end path 5, the path calculation managing part 35 in the area A1 creates a path calculation requesting message 60 for calculating a second end-to-end path 6 by using the result of calculating the first end-to-end path 5.

Figure 9B:
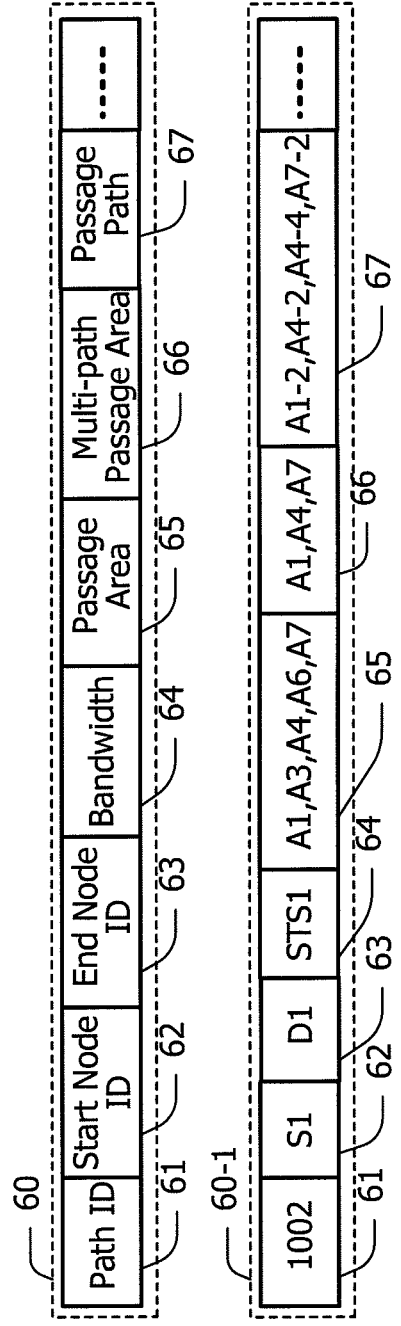
FIG. 9B is a diagram illustrating an example of a path calculation requesting message when calculating a second end-to-end path, according to an embodiment.

FIG. 9A is a diagram illustrating an example of a path calculation requesting message when calculating end-to-end paths under limiting conditions, and FIG. 9B is a diagram illustrating an example of a path calculation requesting message when calculating a second end-to-end path, according to an embodiment.

The path calculation requesting message 40c of FIG. 9A is different from the path calculation requesting message 40 in that the limiting condition 49 is added.

The path calculation requesting message 60 of FIG. 9B includes: path ID 61; start node ID 62; end node ID 63; bandwidth 64; passage area information 65; multi-path passage area information 66; and passage path information 67. The path calculation requesting message 60 used for calculating a second end-to-end path 6 is different from the path calculation requesting message 40 used for calculating a first end-to-end path 5, in that the passage area information 65 indicates areas through which the second end-to-end path 6 passes and passage path information 67 is added.

As mentioned above, second intra-area paths, or the intra-area paths in the multi-path passage area to be used for the second end-to-end path 6, have already been calculated at the time of completion of calculating the first end-to-end path 5, and information on the calculated second intra-area paths has been sent to the path calculation managing part 35 in the start area A1, wherein the information is set at the calculation information 51 included in the path calculation response message 50 which is used when determining the first end-to-end path 5. Therefore, when calculating the second end-to-end path 6, the path calculation managing part 35 selects, as second intra-area paths, intra-area paths within the multi-path passage areas that are different from the first intra-area paths from among the intra-area paths included in the information 51, and creates a path calculation requesting message 60 in which the selected second intra-area paths are set at the passage path information 67 thereof. Then, the path calculation managing part 35 transmits the created path calculation requesting message 60 to the inter-area path calculating part 32.

(13) In a manner similar to the calculation of the first end-to-end path 5, the inter-area path calculating part 32 transmits the path calculation request message 60 to the inter-area path calculation processing part 36 in a next passage area (the area A3) through which the second end-to-end path 6 passes. In an example in FIG. 4B, the next passage area is the area A3. The inter-area path calculation processing part 36 that received the path calculation requesting message 60 transmits the path calculation requesting message 60 to the inter-area path calculation processing part 36 in the next passage area through which the second end-to-end path 6 passes. By repeating the above processing as to each passage area through which the second end-to-end path 6 passes, the path calculation requesting message 60 is finally transmitted to the inter-area path calculation processing part 36 in the end area.

(14) When the inter-area path calculation processing part 36 in the end area A7 receives the path calculation requesting message 60, the inter-area path calculating part 32 thereof checks whether or not the passage path information 67 includes information on the own area (area A7). In the case, since the passage path information 67 includes information on the own area A7, the inter-area path calculating part 32 does not request calculation of intra-area paths within the own area to the path calculation managing part 35. Instead, the inter-area path calculating part 32 compares a path included in the passage path information 67 with intra-area paths stored in the inter-area path calculation part 32. When the intra-area path included in the passage path information 67 matches the intra-area path stored in the inter-area path calculation part 32, the path calculation response message is transmitted to the inter-area path calculation processing part 36 in the area A6 through which the second end-to-end path 6 passes, so as to notify that the path designated by the passage path information 67 can be ensured. Herein the transmitted path calculation response message includes the path calculation requesting message 60 and information on intra-area paths which are designated by the path calculation requesting message 60 and included in the intra-area paths stored in the inter-area path calculating part 32.

(15) The inter-area path calculating part 32 of the inter-area path calculation processing part 36 in the area A6 checks whether or not the own area A6 is the multi-path passage area, and when it is determined that the own area A6 is not the multi-path passage area the inter-area path calculating part 32 requests the path calculation managing part 35 to calculate intra-area paths. The subsequent operations are can be performed in the similar manner described in the steps (8) to (9).

After the calculation of intra-area paths in the area A6 is completed, the path calculation response message 50 is transmitted to the area A4. Thereafter, the processing similar to the step (14) is performed as to the area A4, and the processing similar to the area A6 is next performed as to the area A3. The path calculation response message 50 is finally transmitted to the start area A1.

(16) Since the start area A1 is a multi-path passage area, the intra-area paths calculated as to the area A1 have been already stored in the inter-area path calculating part 32. Therefore, the inter-area path calculating part 32 determines a second end-to-end path 6 on the basis of the stored information on the intra-area paths of the area A1 and the information on the result of calculating the intra-area paths which is set in the path calculation response message received from the passage area A2.

(17) When the calculation of both the first end-to-end path 5 and the second end-to-end path 6 is successful, the path calculation managing part 35 in the start area A1 sends a notification indicating the result of calculating the end-to-end paths to the signaling control part 22 of the path calculating device 10. In response to the notification, the signaling control part 22 performs signaling of the end-to-end paths from the start node S1 to the terminal node D1, and sets the path.

In a manner similar to a first end-to-end path 5, it is also possible to calculate a second end-to-end path 6 by setting the detailed conditions thereof.

Further, a path calculation requesting message 60 for calculating a second end-to-end path 6 can be configured not to include passage path information 67. In the case, when the inter-area path calculation processing part 36 receives a path calculation requesting message 60, the inter-area path calculating part 32 thereof checks whether or not the own area is a multi-path passage area on the basis of a multi-path passage area information 66. When the own area is a multi-path passage area, the inter-area path calculating part 32 does not send a request for calculating intra-area paths within the multi-path passage area to the path calculation managing part 35. For example, the inter-area path calculating part 32 in the end area A7 transmits the path calculation response message including the path calculation requesting message 60 and information on the path calculation result stored in the inter-area path calculating part 32, to the inter-area path calculation processing part 36 in the area A6 through which the second end-to-end path 6 passes. With the structure mentioned above, the second end-to-end path 6 can be determined without designating passage path information 67, by using information on the intra-area paths of the multi-path passage area which is set in the path calculation response message 50 transmitted to the path calculating device 10 in the start area A1.

As described above, as to a multi-path passage area through which both a first end-to-end path 5 and a second end-to-end path 6 pass, the best two intra-area paths can be determined by calculating two intra-area paths within the multi-path passage area at the same time. Therefore, the probability that a second intra-area path to be used for the second end-to-end path 6 will not be acquired because of the shortage of resources caused by acquiring too many resources for a first intra-area path used for the first end-to-end path 5, which may occur in the case of calculating the second intra-area path after the first end-to-end path was calculated, can be reduced.

Further, according to the embodiment mentioned above, since it can be specified as for each area whether a plurality of paths should be calculated or not. Therefore, the embodiment is free from the limiting condition that a plurality of independent end-to-end paths, for example a first end-to-end path 5 and a second end-to-end path 6, should pass through the same areas like the BRPC.

[Second Embodiment of Path Calculation]

According to the first embodiment, the description is given of the case in which the path calculation of both a first end-to-end path 5 and a second end-to-end path 6 is successful. However, even if the calculation of the first end-to-end path 5 is successful, the calculation of an intra-area path to be used for the second end-to-end path 6 in the multi-path passage area may fail. When the calculation of the second end-to-end path 6 fails, an alternative intra-area path needs to be calculated for the second end-to-end path 6.

Hereinafter, a detailed description will be given of an example where the calculation of the second end-to-end path 6 fails in a communication network depicted in FIG. 10. Especially, a method for reporting a failure in path calculation and for calculating an alternative intra-area path used for a second end-to-end path 6 will be described. In the case, for example, it is assumed that calculation of a second intra-area path, that is, an intra-area path to be used for the second end-to-end path 6, failed in the multi-path passage area A2 in FIG. 10.

Figure 10:
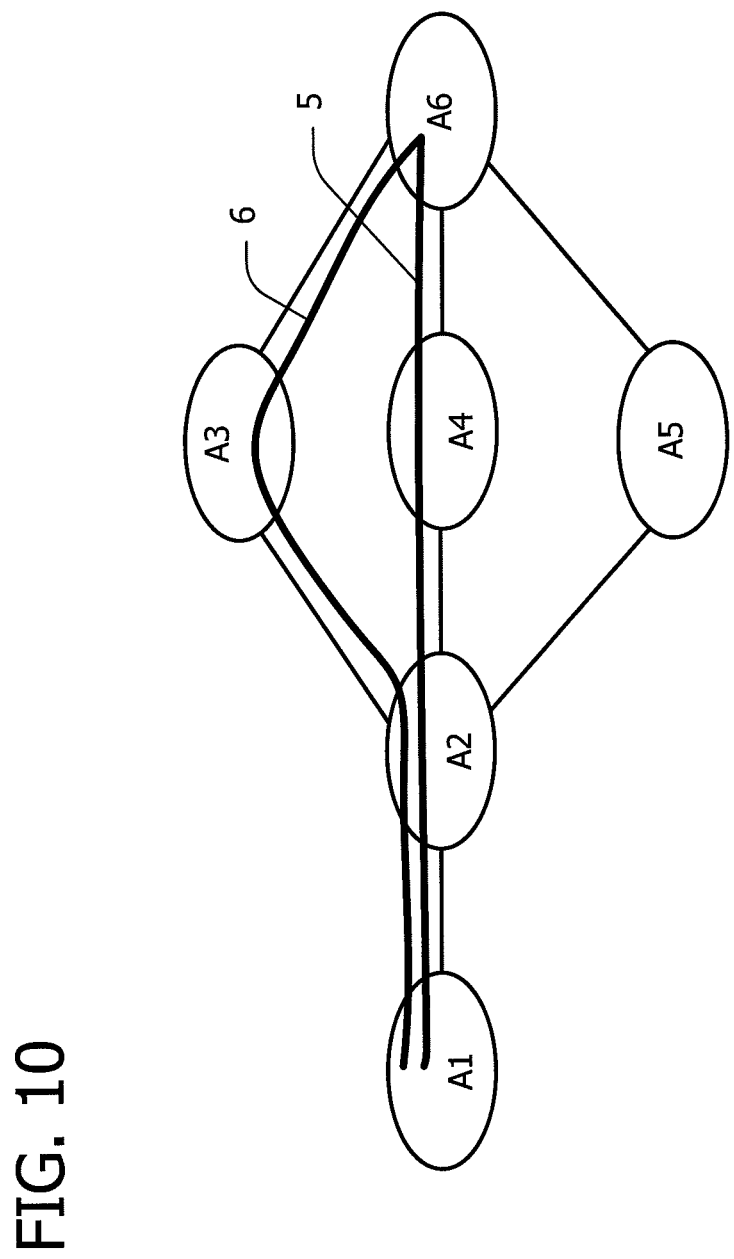
FIG. 10 is a diagram illustrating an example of a communication network in which an alternative intra-area path is calculated.
Figure 11:
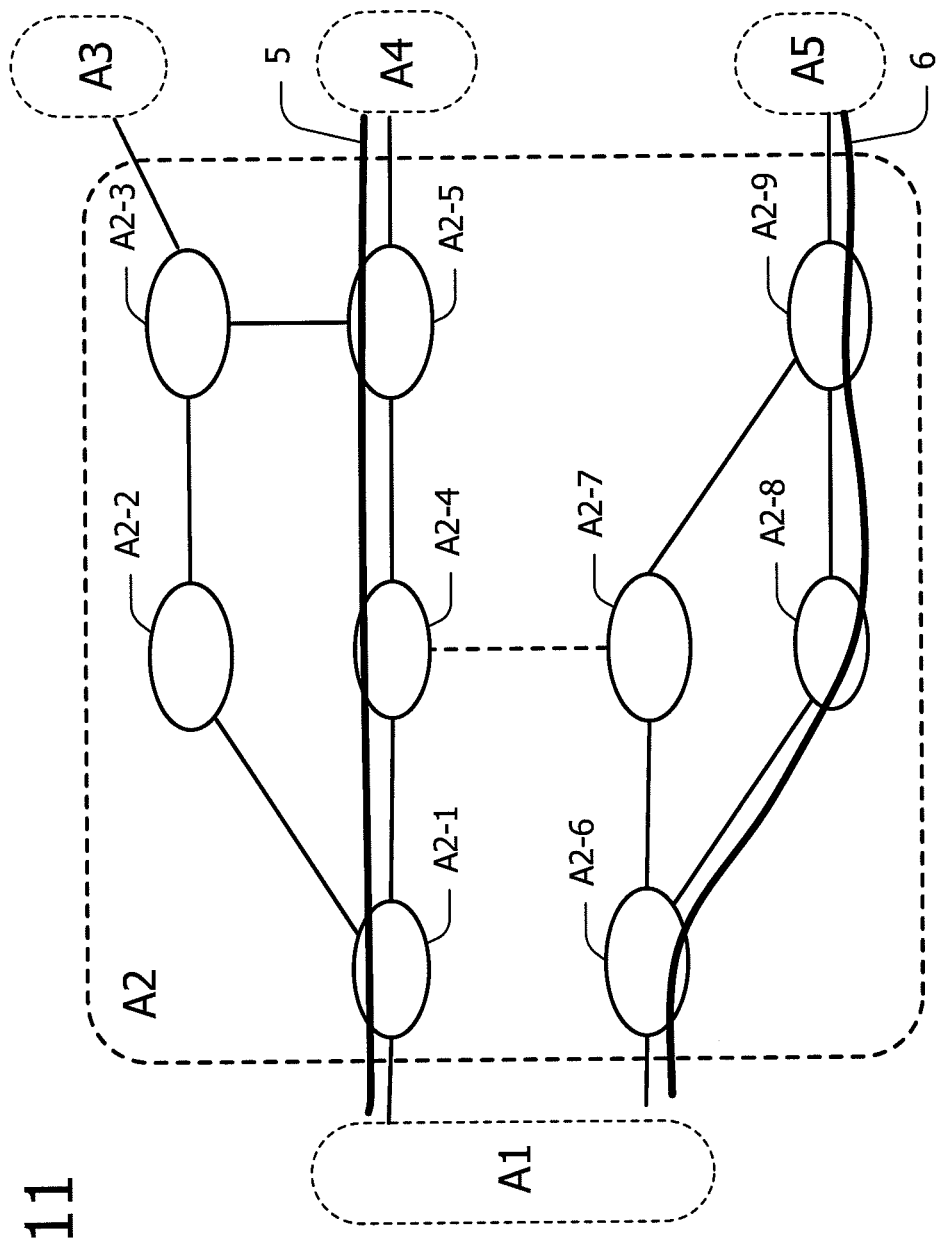
FIG. 11 is a diagram illustrating an example of a multi-path passage area in which calculation of two or more intra-area paths fails.

FIG. 11 is a diagram illustrating an example of a multi-path passage area in which calculation of two or more intra-area paths fails, according to a second embodiment. In the case, the area A2 depicted in FIG. 10 includes nine nodes A2-1 to A2-9, and it is assumed that a second end-to-end path 6 is required to passes from the area A2 to the area A3 by setting node A2-3 at the passage node information 47 of the path calculation requesting message 40a, and calculation condition of node independency is imposed between the first end-to-end path 5 and the second end-to-end path 6.

Further, a method described herein can be similarly applied in the case of performing a path calculation by designating boundary nodes, or in the case of designating passage areas of a second end-to-end path 6 by using other calculation conditions.

[Report of Failure in Path Calculation and Calculation of Alternative Path]

Firstly, the path calculation part 30 executes calculation of a first end-to-end path 5 and intra-area paths within a multi-path passage area in a manner similar to the steps (1) to (9) described according to the first embodiment. Hereinafter, operations after the path calculation response message 50 is transmitted to the area A2 from the inter-area path calculating part 32 in the area A4 will be described in the following steps (1) to (4).

(1) When the path calculation response message 50 is transmitted to the area A2 from the inter-area path calculating part 32 in the area A4, the calculation of intra-area paths within the area A2 starts. The path calculation managing part 35 in the area A2 checks whether or not the own area (area A2) is a multi-path passage area by referring to the path calculation requesting message 40 stored in the received path calculation response message 50. When the own area A2 is a multi-path passage area, the path calculation managing part 35 sends a request for calculating intra-area paths to the intra-area path calculating part 34 together with information on the calculation condition of a second end-to-end path 6.

The intra-area path calculating part 34 tries to calculate a first intra-area path passing from the area A1 to the area A4 in FIG. 10 as a segment of the first end-to-end path 5 and a second intra-area path passing from the area A1 to the area A3 in FIG. 10 as a segment of the second end-to-end path 6. In the case, it is assumed that there is no bandwidth between the nodes A2-4 and A2-7 in FIG. 11 satisfying the bandwidth condition designated by the bandwidth information 44 of the path calculation requesting message 40. In the case, the intra-area path calculating part 34 can calculate, for the first end-to-end path 5, the first intra-area path passing through the nodes A2-5, A2-4, and A2-1 in FIG. 11. However, in order to set the second end-to-end path 6 to be node independent of the first end-to-end path 5, a intra-area path passing through the nodes A2-3, A2-2, and A2-1 in FIG. 11 can not be selected. Further, an intra-area path passing between the nodes A2-4 and A2-7 in FIG. 11 cannot be selected since there is no available bandwidth between the nodes A2-4 and A2-7. Therefore, the intra-area path calculating part 34 fails to calculate a second intra-area path to be used for the second end-to-end path 6.

(2) The intra-area path calculating part 34 sends the result of calculating the first intra-area path for the first end-to-end path 5 and the failure in calculating the second intra-area path to be used for the second end-to-end path 6, to the inter-area path calculating part 32 through the path calculation managing part 35. The inter-area path calculating part 32 extracts the boundary node information from the received result of intra-area path calculation, and the extracted boundary node information is stored in a memory thereof together with the information indicating failure in calculating the second intra-area path to be used for the second end-to-end path 6. For example, when the first intra-area path for the end-to-end path 5 passes through the nodes A2-5, A2-4, and A2-1 in FIG. 11 and the second intra-area path to be used for the second end-to-end path 6 is not found, for example, information indicating "(A2-5)-(A2-1)" and "NONE" is stored in the memory.

(3) the inter-area path calculation processing part 36 in the area A2 creates the path calculation response message 50 by adding the path calculation result to the path calculation requesting message 40, in a manner similar to the case that an intra-area path calculation succeeded.

Figure 12:
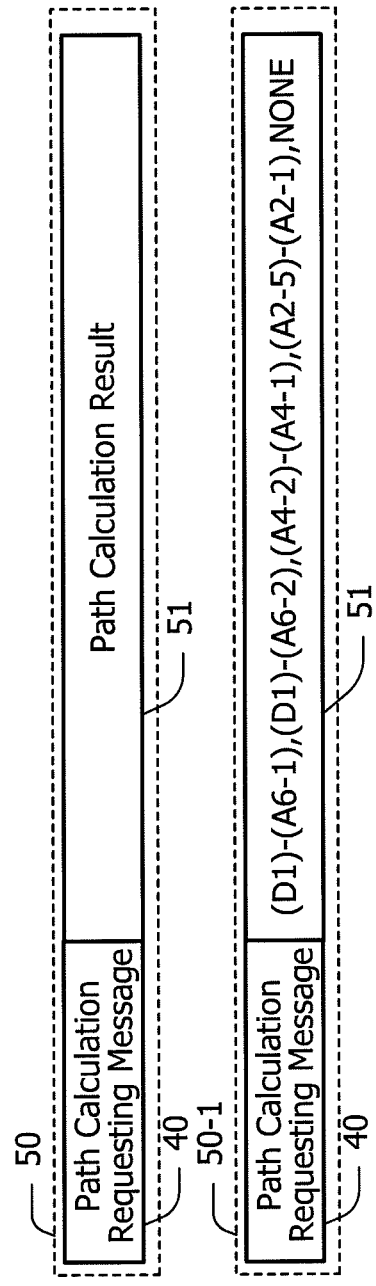
FIG. 12 is a diagram illustrating an example of a path calculation response message indicating a failure in calculating a second intra-area path, according to a second embodiment.

FIG. 12 is a diagram illustrating an example of a path calculation response message indicating a failure in calculating a second intra-area path, according to the second embodiment.

The inter-area path calculation processing part 36 in the area A2 transmits the path calculation response message 50 to the inter-area path calculation processing part 36 in the start area A1.

(4) The path calculation managing part 35 in the start area A1 determines the first end-to-end path 5 in a manner similar to the step (11) described according to the first embodiment. With respect to the second end-to-end path 6, "NONE" is recorded in the path calculation response message 50, and it is recognized that the intra-area path calculation in the multi-path passage area failed. Therefore, since a second intra-area path to be used for the second end-to-end path 6 needs to be calculated again, the path calculation managing part 35 request the inter-area path calculating part 32 to re-select a sequence of passage areas to be used for a second end-to-end path 6.

The path calculation managing part 35 creates a path calculation requesting message 60 for calculating the second end-to-end path 6, on the basis of a sequence of passage areas re-calculated by the inter-area path calculating part 32. The calculation of intra-area paths based on the path calculation requesting message 60 for calculating the second end-to-end path 6 can be performed in a manner similar to the steps (12) to (17) described above according to the first embodiment.

As mentioned above, in the case of failure in calculating the second intra-area path to be used for the second end-to-end path 6, upon receiving the path calculation response message 50 including information indicating failure in finding a second intra-area path used for the second end-to-end path 6, the path calculation part 30 in the start area determines the first end-to-end path 5 and re-calculates only the second end-to-end path 6.

[Autonomous Alternative Path Calculation]

In the example according to the embodiments mentioned above, an alternative intra-area path is calculated after the inter-area path calculation part in the start area re-selects a sequence of passage areas. However, the intra-area path calculating part 34 of the multi-path passage area, in which the calculation of the second intra-area path to be used for the second end-to-end path 6 failed, can be configured to autonomously calculate an alternative intra-area path. In the case, the intra-area path calculating part 34, which failed in calculating a second intra-area path, calculates, as an alternative intra-area path, an intra-area path connectable to another area adjacent to the multi-path passage area, and the information on the calculated alternative intra-area path is set in the path calculation response message 50 to be notified. Hereinafter, the detailed description will be given with reference to FIGS. 10 and 11, in the following steps (1) to (5).

(1) The intra-area path calculating part 34, for example, in the area A2 that failed to calculate a second intra-area path to be used for the second end-to-end path 6, reports the failure of calculation to the path calculation managing part 35. The path calculation managing part 35 that received the failure report inquires about an area adjacent to the own area (area A2) at the inter-area path calculating part 32. The inter-area path calculating part 32 searches for the adjacent area by using the summary information stored in the inter-area routing processing part 31, and sends a notification indicating the adjacent area found to the path calculation managing part 35.

(2) Upon receiving from the inter-area path calculating part 32 the notification indicating that there exist areas A4 and A5, as an adjacent area, other than area A3, the path calculation managing part 35 sends to the intra-area path calculating part 34 a notification indicating that areas A4 and A5 are areas adjacent to the own area (area A2). The intra-area path calculating part 34 that received the notification calculates an alternative intra-area path connectable to the area A4 or A5. In an example depicted in FIG. 11, in order to connect to the area A4, the nodes already used by the first end-to-end path 5, such as nodes A2-1 and A2-5, need to be used. Therefore, it is determined that an alternative intra-area path connectable to the area A4 cannot be calculated. Subsequently, another alternative intra-area path connectable to the area A5 is searched for, thereby obtaining an alternative intra-area path passing through the nodes A2-9, A2-8, and A2-6. The intra-area path calculating part 34 sends a notification indicating the obtained alternative intra-area path to the path calculation managing part 35.

(3) Upon receiving the notification, the path calculation managing part 35 sends a notification indicating the result of calculating the alternative intra-area path to the inter-area path calculating part 32 which extracts and stores the boundary nodes A2-9 and A2-6 included in the obtained alternative intra-area path. Further, the inter-area path calculating part 32 transmits to the start area (the area A1) the path calculation response message 50 in which the information on the alternative intra-area path is added.

(4) When the path calculation response message 50 is transmitted to the start area A1, the intra-area path calculating part 34 in the area A1 calculates intra-area paths within the start area A1, and the path calculation managing part 35 determines the first end-to-end path 5 on the basis of the received path calculation response message 50 and the calculated intra-area paths of the area A1.

(5) After determining the first end-to-end path 5, the path calculation requesting message 60 for a second end-to-end path 6 is created. Among intra-area paths included in the information 51 of the path calculation response message 50, an intra-area path that is not used for the first end-to-end path 5 is determined as a passage path to be set in the information 67. That is, the path calculation managing part 35 checks, by using information given to the inter-area path calculating part 32, whether or not the intra-area path designated by the passage path information 67 is the same as the intra-area path determined when calculating the first end-to-end path 5.

In the example depicted in FIG. 11, as the result of calculating a second intra-area path to be used for the second end-to-end path 6, "(A2-9)-(A2-6)" is set in the passage path information 67 of the path calculation requesting message 60. Since the node A2-3 is designated as the passage node in the path calculation requesting message 40 for the second end-to-end path 6, it can be determined that an alternative intra-area path was calculated in the area A2.

When the alternative intra-area path is calculated, the inter-area path calculating part 32 re-selects a second sequence of passage areas for a second end-to-end path 6 so that the second end-to-end path 6 passes through an area connectable from the calculated alternative intra-area path. For example, the inter-area path calculating part 32 determines that the node A2-9 included in the alternative intra-area path is a boundary node of the area A2 from which the area A5 is connectable. Then, a second sequence of passage areas for the second end-to-end path 6 is re-selected so that the second end-to-end path 6 passes through the areas A2 and A5. The path calculation managing part 35 creates the path calculation requesting message 60 in which information on the re-selected second sequence of passage areas is set as passage area information 65, and requests calculation of the second end-to-end path 6. The process of calculation of an end-to-end path based on the path calculation requesting message 60 for calculating the second end-to-end path 6 is similar to the steps (12) to (17) described according to the first embodiment.

Further, when the intra-area path calculating part 34 autonomously calculates an alternative intra-area path, another area to which the alternative intra-area path is connectable can be determined according to the priority assigned to the area.

Figure 13:
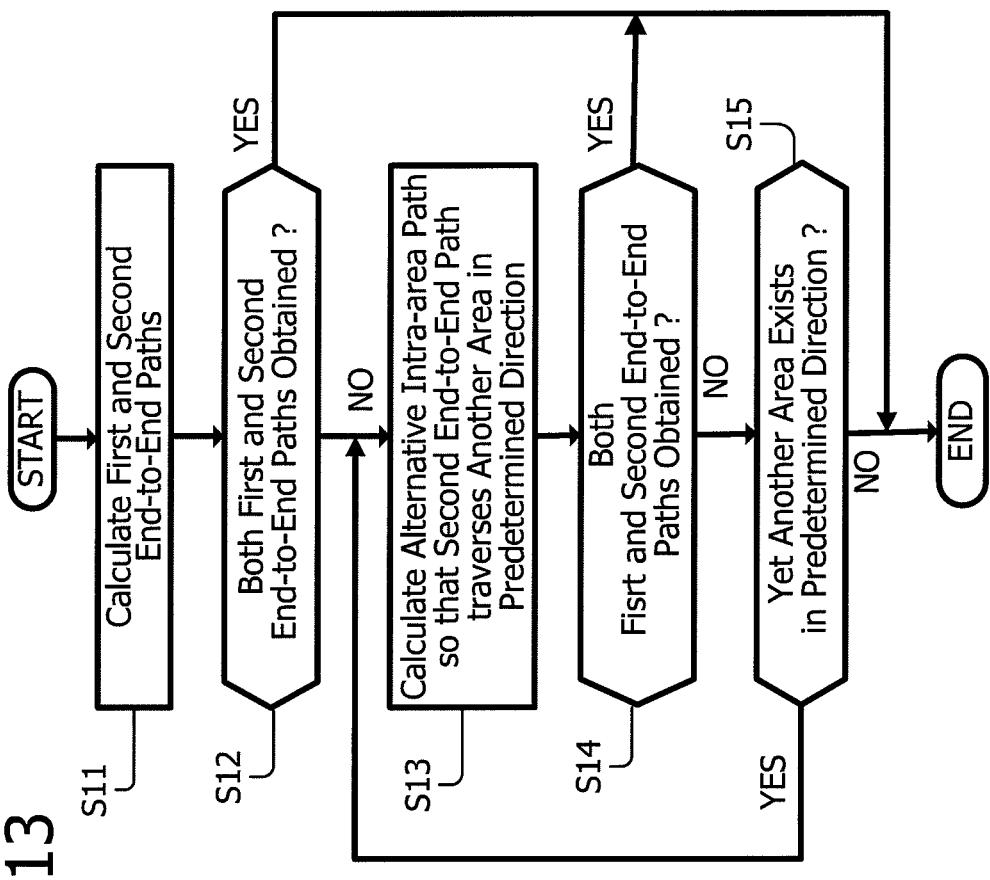
FIG. 13 is a diagram illustrating an example of a flowchart representing a method for calculating a second end-to-end path by changing a passage area traversed thereby, according to a second embodiment.

FIG. 13 is a diagram illustrating an example of a flowchart representing a method for calculating a second end-to-end path by changing a passage area traversed thereby. In an example depicted in FIG. 13, a first end-to-end path 5 and a second end-to-end path 6 are calculated (in step S11). When the calculation of the second end-to-end path 6 fails (NO in step S12), an alternative intra-area path is calculated so that the second end-to-end path 6 passes through another area adjacent to the multi-path passage area in a predetermined direction from the area which was obtained as one of a second sequence of passage areas at the time of starting path calculation (in step S13). When there are two or more areas in the predetermined direction, the path calculation managing part 35 can be configured to select one of the two or more areas by using the summary information given to the inter-area routing processing part 31, and to send a notification indicating the selected area to the intra-area path calculating part 34. Further, the path calculation managing part 35 can be configured to store information on areas adjacent to the multi-path passage area and the priority thereof which were notified from the inter-area path calculating part 32, and notify the intra-area path calculating part 34 of information on the adjacent area having the highest priority in the case of failure in path calculation.

As mentioned above, intra-area paths can be calculated in the direction from the end node to the start node. Therefore, for example, the direction from the end node to the start node can be used as a predetermined direction.

When both the first end-to-end path 5 and the second end-to-end path 6 were obtained as a result of calculating an alternative intra-area path to be used for the second end-to-end path 6 traversing an adjacent area in the predetermined direction, the calculation of end-to-end oaths ends (YES in step S14). When the calculation of an alternative intra-area path to be used for the second end-to-end path 6 fails again (NO in step S14) and there is yet another area in the predetermined direction (YES in step S15), it is determined whether or not a second end-to-end path 6 can be obtained so that the second end-to-end path 6 traverses yet another area in the predetermined direction (in steps S15, S13, and S14). Herein, the second end-to-end path 6 can be calculated in the similar manner described above.

That is, the calculation of intra-area paths within the multi-path passage area is sequentially tried as to each available area in the predetermined direction, and an alternative intra-area path for the second end-to-end path 6 is calculated repeatedly until there exist no available areas left in the predetermined direction. When the path calculation fails and there are no available areas left in the predetermined direction, the intra-area path calculating part 34 sends a notification indicating that the calculation of intra-area paths failed, to the path calculation managing part 35. The path calculation managing part 35 notifies the inter-area path calculating part 32 about the failure in calculating intra-area paths, and then the inter-area path calculating part 32 stores "NONE" as the result of the path calculation.

An alternative intra-area path can be calculated in the similar manner described above in the case that the detailed information other than the passage boundary node is designated in the path calculation requesting message 40 or no detailed conditions are set.

As mentioned above, by configuring the intra-area path calculating part 34 to autonomously calculate the alternative intra-area path in the area where the calculation of an intra-area path failed, a second sequence of passage areas for the second end-to-end path 6 can be selected so as to re-calculate the second end-to-end path 6 by using, as a segment thereof, an alternative intra-area path which was calculated previously. That is, similarly to the method according to the first embodiment, intra-area paths to be used for the second end-to-end path 6 can be calculated in the multi-path passage area before the path calculation requesting message 60 for the second end-to-end path 6 is transmitted. Therefore, the probability of success in calculating the second end-to-end path 6 is improved, as compared to the case in which, a second sequence of passage areas for the second end-to-end path 6 is determined and the second end-to-end path 6 is calculated independently of the calculation of the first end-to-end path 5 after the calculation and setting of the first end-to-end path 5 have completed.

[Failure in Calculating a Second End-to-end Path in an Area Other than a Multi-path Passage Area]

In the second embodiment, the description was given of coping process in the case of failure in calculation of the second end-to-end path 6 which was caused by failure in calculation of intra-area paths within the multi-path passage area. However, even if the calculation of the first end-to-end path 5 and two or more intra-area paths within the multi-path passage area is successful, calculation of the second end-to-end path 6 may fail because of the shortage of resources in an area through which only the second end-to-end path 6 passes.

The inter-area path calculating part 32 in the area in which the calculation of intra-area paths for the second end-to-end path 6 failed receives a report indicating that there are no available resources for setting of intra-area paths within the area, from the intra-area path calculating part 34 through the path calculation managing part 35. Then, "NONE" is stored, as a result of the calculation, in the field of path calculation result 51 which is transmitted to the start area, as mentioned above. In the start area, a second sequence of passage areas is selected again in order to re-calculate the second end-to-end path 6.

[Failure in Calculation of Both a First and Second Intra-area Paths]

When calculation of intra-area paths to be used for both the first end-to-end path 5 and the second end-to-end path 6 failed in the multi-path passage area, the inter-area path calculating part 32 receives a notification indicating that intra-area paths to be used for both the first end-to-end path 5 and the second end-to-end path 6 are not found, from the intra-area path calculating part 34 through the path calculation managing part 35. In the case, the inter-area path calculating part 32 stores "NONE" with respect to both the first end-to-end path 5 and the second end-to-end path 6 in the field of path calculation result 51.

That is, as to an area in which intra-area paths to be used for the first end-to-end path 5 and the second end-to-end path 6 are not obtained, "NONE" is set for both the first end-to-end path 5 and the second end-to-end path 6 in the field of path calculation result 51 when creating the path calculation response message 50.

Upon receiving the path calculation result 51 in which "NONE" is set with respect to the first end-to-end path 5, the inter-area path calculating part 32 in the start area A1 re-selects two sequences of passage areas as to both the first end-to-end path 5 and the second end-to-end path 6, and calculates both the first end-to-end path 5 and the second end-to-end path 6 on the basis of the re-selected two sequences of passage areas.

Further, in the case of failure in calculating intra-area paths within an area through which only the first end-to-end path 5 passes, the path calculation response message 50 including "NONE" with respect to the first end-to-end path 5 is transmitted to the inter-area path calculating part 32 in the start area. Then, the inter-area path calculating part 32 in the start area re-selects two sequences of passage areas for the first end-to-end path 5 and the second end-to-end path 6, and calculates two end-to-end paths on the basis of the re-calculated result, in the similar manner mentioned above.

Figure 14:
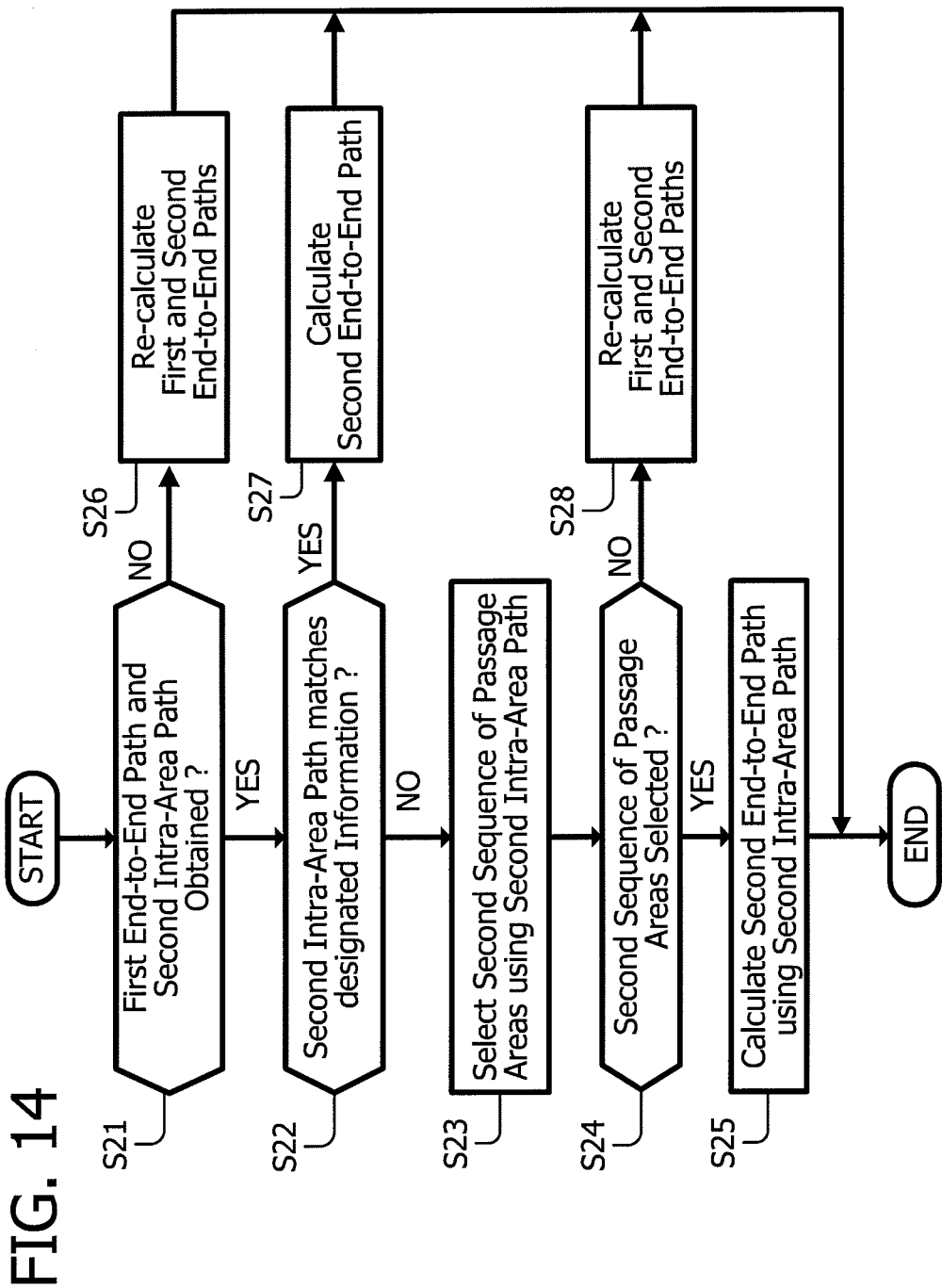
FIG. 14 is a diagram illustrating an example of a flowchart for calculating end-to-end paths according to first and second embodiments.

FIG. 14 is a diagram illustrating an example of a flowchart for calculating end-to-end paths according to first and second embodiments.

First of all, a first end-to-end path 5 and a second intra-area path in the multi-path passage area to be used for a second end-to-end path 6 are calculated, and it is checked whether or not the first end-to-end path 5 and a second intra-area path in the multi-path passage area to be used for the second end-to-end path 6 are obtained (in step S21). When both the first end-to-end path 5 and the second intra-area path are not found or when calculation of the first end-to-end path 5 failed, re-calculation of both the first end-to-end path 5 and the second end-to-end path 6, including re-selection of sequences of passage areas therefor, is performed (in step S26).

When the first end-to-end path 5 and the second intra-area path in the multi-path passage area to be used for the second end-to-end path 6 have been obtained, it is further determined whether or not the second intra-area path matches the information designated by inter-area path calculation part (in step S22). When it is determined that the second intra-area path matches the previously designated information, intra-area paths within passage areas through which only the second end-to-end path 6 passes are calculated to obtain the second end-to-end path 6 (in step S27, according to the first embodiment).

When the second intra-area path calculated for the second end-to-end path 6 with respect to the multi-path passage area does not match the designated information, a second end-to-end path 6 is calculated by re-selecting a second sequence of passage areas, so as to include the calculated second intra-area path as a segment thereof and pass through the re-selected second sequence of passage areas (in steps S23 to S25, the second embodiment).

When calculation of the second intra-area path for the second end-to-end path 6 failed, re-calculation of the first end-to-end path 5 and the second end-to-end path 6, including re-selection of first and second sequences of passage areas, is performed (in steps S24 and S28).

By performing calculation of a plurality of end-to-end paths as mentioned above, the probability of re-calculation of both the first end-to-end path 5 and the second end-to-end path 6 can be reduced, and the setting of end-to-end paths can be performed rapidly.

The present invention is not limited to the embodiments mentioned above, and can be variously modified. Hereinafter, examples thereof will be described.

[Embodiment of Path Calculation Using External Device]

According to the embodiments as described above, the path calculation part 30 is provided for the path calculating device 10. Further, the path calculation part 30 includes: the inter-area routing processing part 31; the inter-area path calculating part 32; the intra-area routing processing part 33; the intra-area path calculating part 34; and the path calculation managing part 35. However, the path calculation part 30 may be provided for an external device such as the PCE 4 so that the external device can perform the path calculation. Further, the path calculation part 30 or portion of the path calculation part 30 may be provided for an external computer such as an NMS (network management system) or an EMS (element management system).

Figure 15:
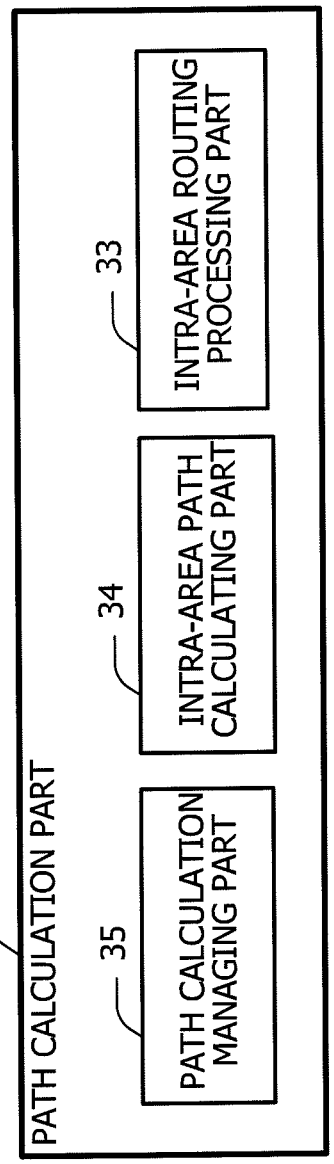
FIG. 15 is a diagram illustrating an example of a structure of a path calculation part that is equipped with an external device, according to an embodiment.
Figure 16:
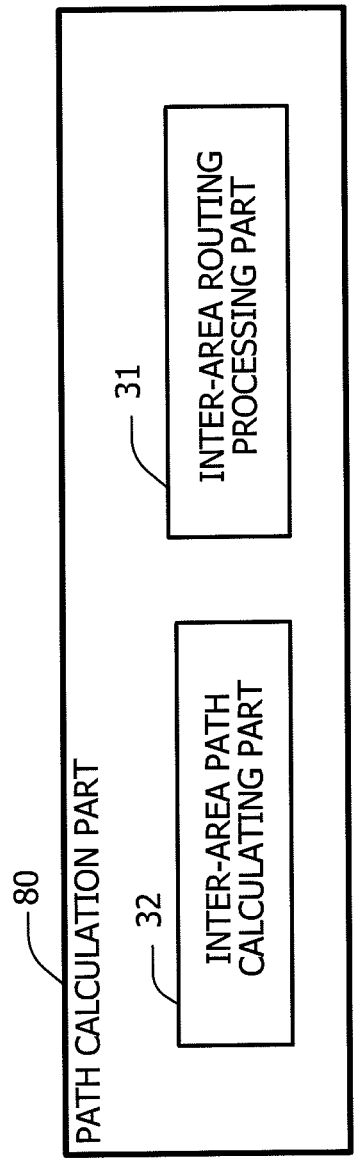
FIG. 16 is a diagram illustrating an example of the structure of a path calculation part that is equipped with an external device, according to an embodiment.

In the case of calculating a plurality of end-to-end paths, in many cases, calculation of end-to-end paths is performed by a portion of all the nodes included in the area. The number of nodes by which the intra-area path calculation can be performed is generally assumed to be larger than the number of nodes by which the end-to-end paths can be calculated. Therefore, as depicted in FIG. 15, only the intra-area routing processing part 33, the intra-area path calculating part 34, and the path calculation managing part 35 can be provided for the path calculating device 10, as a path calculation part 70. In the case, only the inter-area routing processing part 31 and the inter-area path calculating part 32 can be provided for a path calculation part 80 in an external device, as depicted in FIG. 16. As mentioned above, by providing each node with a portion for executing the intra-area path calculation and by providing the external device with a portion for executing the calculation of end-to-end paths, the system can be simplified without increasing the burden of path calculation imposed on each node.

Figure 17:
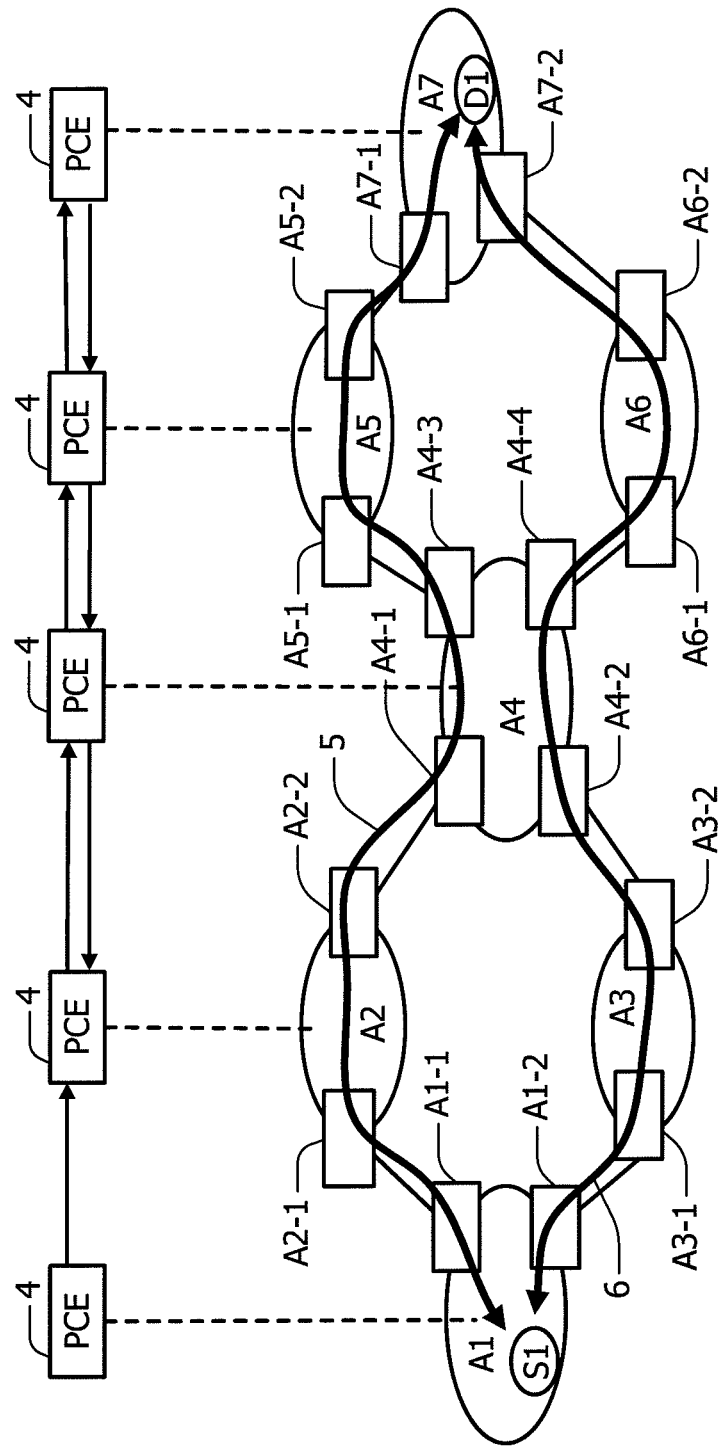
FIG. 17 is a diagram illustrating an example of calculating a first end-to-end path by using an external device according to an embodiment.

FIG. 17 is a diagram illustrating an example of calculating a first end-to-end path by using an external device, according to an embodiment.

Figure 18:
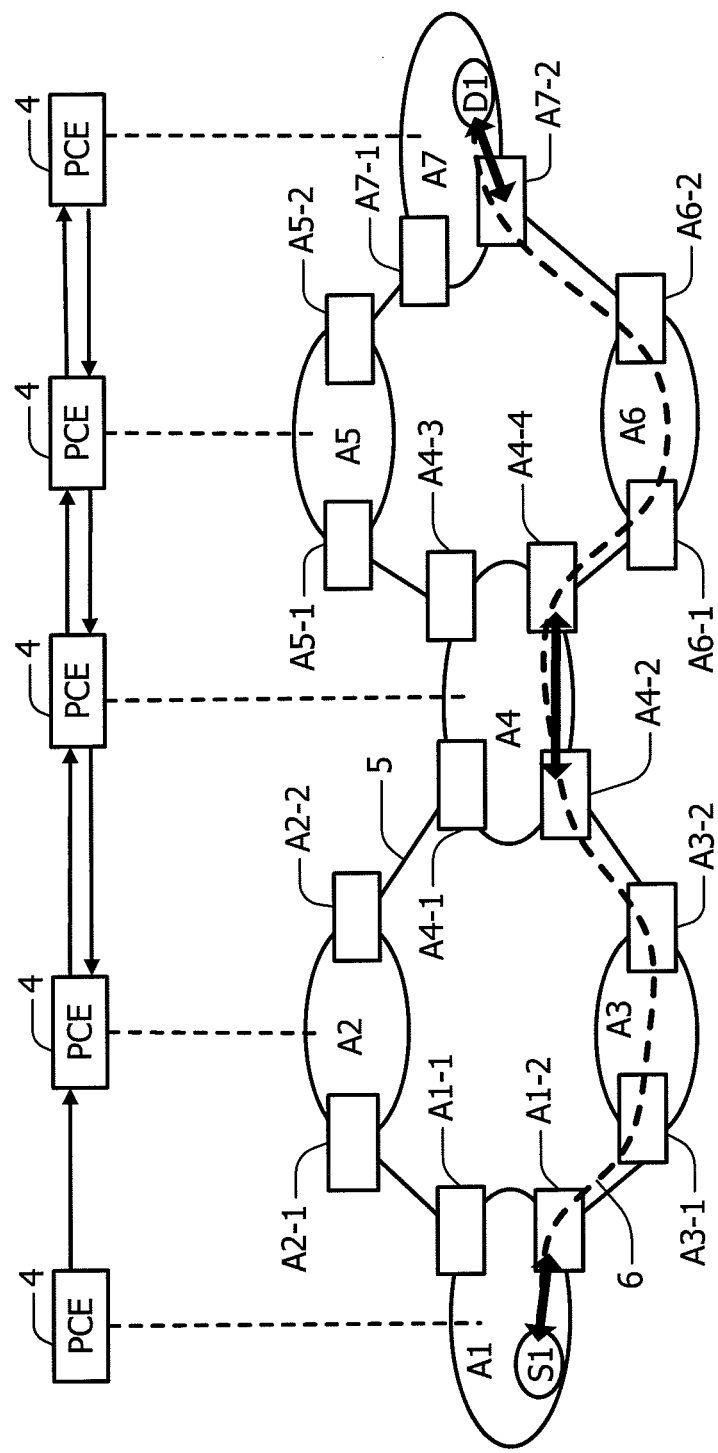
FIG. 18 is a diagram illustrating an example of calculating a second end-to-end path by using an external device according to an embodiment.

The inter-area path calculating part 32 included in the PCE 4 that executes the path calculation of the start area A1 selects a sequence of passage areas for each of the plurality of end-to-end paths to be calculated, and transmits the path calculation requesting message 40 to the PCEs 4 that execute the path calculation of areas through which a first end-to-end path 5 passes. The operation for calculating the first end-to-end path 5 is performed in the similar manner described above. However, since the PCE 4 has the inter-area path calculating part 32 and the inter-area routing processing part 31, information recorded in the path calculation requesting message 40 is transmitted, as necessary, from the PCE 4 to the path calculation managing part 35 of a node that executes the calculation of intra-area paths. After the first end-to-end path 5 and the second intra-area paths within the multi-path passage areas have been obtained, as depicted in FIG. 18, the path calculation request message 60 is transmitted to the PCE 4 corresponding to the area through which the second end-to-end path 6 passes, and the second end-to-end path 6 is calculated. When calculating the second end-to-end path 6, only the portion (depicted by dotted line in FIG. 18) other than the portion included in the multi-path passage area (depicted by an arrow in FIG. 18) is calculated, as mentioned above.

As conditions for calculation of end-to-end paths, passage nodes or passage paths can be specified as mentioned above. When only the passage nodes are specified without specifying passage areas by using area ID, the path calculation method mentioned above can be performed in such a manner that multi-path passage areas are extracted by checking the passage areas using IDs of the passage nodes.

In the above description, it is assumed that the path calculation part 30 and the path calculation part 70 have the path calculation managing part 35. However, the path calculation part 30 and the path calculation part 70 can be configured without including the path calculation managing part 35. When the path calculation part 30 and the path calculation part 70 do not include the path calculation managing part 35, another part such as the intra-area path calculating part 34 can be configured to realize the function of the path calculation managing part 35.

Further, according to the embodiments, the path calculation part 30 and the path calculation part 70 are included in the routing control part 23. Alternatively, the path calculation part 30 and the path calculation part 70 can be arranged anywhere in the intra-device monitoring control part 20. Further, the path calculation part 30 and the path calculation part 70 can be realized by not only the hardware circuit having a plurality of parts but also software using the function of the portion included in the intra-device monitoring control part 20.

In the specification, the case where the two end-to-end paths of a first end-to-end path 5 and a second end-to-end path 6 are calculated, is described in detail as a representative case, for convenience of explanation. However, three or more end-to-end paths can be calculated at once. In the case of calculating three or more end-to-end paths at once, with respect to an area through which a plurality of end-to-end paths pass, the same number of intra-area paths as the number of end-to-end paths passing through the area can be calculated. Further, upon calculating three or more paths, two or more alternative intra-area paths can be calculated. When calculating a plurality of alternative intra-area paths, areas reachable from the plurality of alternative intra-area paths in the multi-path passage area may be different or identical between different alternative intra-area paths which are simultaneously calculated.

What is claimed is:

1. An apparatus for calculating a plurality of end-to-end paths each having a given bandwidth and communicably connecting two terminal nodes in a communication network divided into a plurality of areas, the apparatus comprising:
a memory for storing information on the plurality of areas; and
a processor to:
select, from among the plurality of areas, a first sequence of passage areas to be traversed by a first end-to-end path and a second sequence of passage areas to be traversed by a second end-to-end path, based on the information on the plurality of areas,
select, from among the first sequence of passage areas, multi-path passing areas each defined as an area to be traversed by both the first and second end-to-end paths,
calculate two or more intra-area paths for each of the multi-path passage areas, each of the two or more intra-area paths being defined as a communication path that communicably connects two different boundary nodes within an area and has the given bandwidth, the two or more intra-area paths being calculated by a node in the each of the multi-path passage areas based on path calculation requesting message that is transferred along the first sequence of passage areas, the path calculation requesting message including bandwidth information indicating the given bandwidth, passage area information identifying the first sequence of passage areas, and multi-path passage area information identifying the multi-path passage areas,
select, for each of the multi-path passage areas, first and second intra-area path from among the calculated two or more intra-area paths, and
determine the first and second end-to-end paths so that the first and second end-to-end paths include the selected first and second intra-area paths, respectively, and so that each of the first and second end-to-end paths has the given bandwidth.

2. The apparatus of claim 1, wherein
the processor calculates, when there exists such a multi-path passage area in which the number of the calculated intra-area paths therein is less than two, an alternative intra-area path that exists within the multi-path passage area and is communicably connectable to another area adjacent to the multi-path passage area, and
the processor determines a third end-to-end path so that the third end-to-end path includes the calculated alternative intra-area path as a segment thereof, has the given bandwidth, and traverses a third sequence of passage areas that is selected among the plurality of areas and includes as a passage area thereof the another area adjacent to the multi-path passage area.

3. The apparatus of claim 1, wherein
the processor further calculates, when there exists such a multi-path passage area in which the number of the calculated intra-area paths therein is less than the number of the end-to-end paths passing therethrough, an alternative intra-area path that exists within the multi-path passage area and is communicably connectable to another area adjacent to the multi-path passage area, and
the processor determines a third end-to-end path so that the third end-to-end path includes as a segment thereof the alternative intra-area path, has the given bandwidth, and traverses a third sequence of passage areas that is selected among the plurality of areas and includes as a passage area thereof the another area adjacent to the multi-path passage area.

4. The apparatus of claim 1, wherein
the multi-path passage area is identified by boundary nodes therein, and the processor calculates an intra-area path by using information on the boundary nodes.

5. The apparatus of claim 1, wherein
the first and second sequences of passage areas are selected so that the first and second end-to-end paths do not pass through the same node in common.

6. The apparatus of claim 1, wherein
the first and second sequences of passage areas are selected so that the first and second end-to-end paths do not pass through the same communication link in common.

7. The apparatus of claim 1, wherein
the first and second sequences of passage areas are selected so that the first and second end-to-end paths do not pass through a communication link having the same risk in common.

8. A system for calculating a plurality of end-to-end paths each Having a given bandwidth and communicably connecting two terminal nodes in a communication network divided into a plurality of areas, the system comprising:
a first path calculating device to:
select, from among the plurality of areas, a first sequence of passage areas to be traversed by a first end-to-end path and a second sequence of passage areas to be traversed by a second end-to-end path, and
select, from among the first sequence of passage areas, multi-path passage areas each defined as an area to be traversed by two or more end-to-end paths; and
a second path calculating device to calculate two or more intra-area paths for each of the multi-path passage areas, each of the two or more intra-area paths being defined as a communication path having the given bandwidth and communicably connecting two different boundary nodes with an area, the two or more intra-area paths being calculated by a node in the each of the multi-path passage areas based on a path calculation requesting message that is transferred along the first sequence of passage areas, the path calculation requesting message including bandwidth information indicating the given bandwidth, passage area information identifying the first sequence of passage areas, and multi-path passage area information identifying the multi-path passage areas, wherein
the first path calculating device sends to the second path calculating device information on the first sequence of passage areas and the multi-path passage areas, the second path calculating device sends to the first path calculating device the result of calculating the two or more intra-area paths for each of the multi-path passage areas, the first path calculating device selects, for each of the multi-path passage areas, first and second intra-area paths from among the calculated two or more intra-area paths, and the first path calculating device determines the first and second end-to-end paths so that the first and second end-to-end paths include the selected first and second intra-area paths, respectively, and each of the first and second end-to-end paths has the given bandwidth.

9. The system of claim 8, wherein, the second path calculating device calculates, when there exists such a multi-path passage area in which the number of the calculated intra-area paths is less than two, an alternative intra-area path that exists within the multi-path passage area, has the given bandwidth, and is communicably connectable to another area adjacent to the multi-path passage area, and the first path calculating device determines a third end-to-end path so that the third end-to-end path includes as a segment thereof the calculated alternative intra-area path, has the given bandwidth, and traverses a third sequence of passage areas that is selected among the plurality of areas and includes as a passage area thereof the another area adjacent to the multi-path passage area.

10. The system of claim 8, wherein the second path calculating device further calculates, when there exists such a multi-path passage area in which the number of the calculated intra-area paths therein is less than the number of the end-to-end paths passing therethrough, an alternative intra-area path that exists within the multi-path passage area and is communicably connectable to another area adjacent to the multi-path passage area, and the first path calculating device determines a third end-to-end path so that the third end-to-end path includes as a segment thereof the alternative intra-area path, has the given bandwidth, and traverses a third sequence of passage areas that is selected from among the plurality of areas and includes as a passage area thereof the another area adjacent to the multi-path passage area.

11. A method for calculating a plurality of end-to-end paths each having a given bandwidth and communicably connecting two terminal nodes in a communication network divided into a plurality of areas, the method comprising:

selecting, from among the plurality of areas, a first sequence of passage areas to be traversed by a first end-to-end path and a second sequence of passage areas to be traversed by a second end-to-end path;

selecting, from among the first sequence of passage areas, multi-path passing areas each defined as an area to be traversed by two or more end-to-end paths;

calculating two or more intra-area paths for each of the multi-path passage areas, each of the two or more intra-area paths being defined as a communication path having the given bandwidth and communicably connecting two different boundary nodes with an area, the two or more intra-area paths beings calculated by a node in the each of the multi-path passage areas based on a path calculation requesting message that is transferred along the first sequence of passage areas, the path calculation requesting message including bandwidth information indicating the given bandwidth, passage area information identifying the first sequence of passage areas, and multi-path passage area information identifying the multi-path passage areas;

selecting, for each of the multi-path passage areas, first and second intra-area paths from among the calculated two or more intra-area paths, and determining the first and second end-to-end paths so that the first and second end-to-end paths include the selected first and second intra-area paths, respectively, and each of the first and second end-to-end paths has the given bandwidth.

12. The method of claim 11, further comprising:

calculating, when there exists such a multi-path passage area in which the number of the calculated intra-area paths therein is less than two, an alternative intra-area path that exists within the multi-path passage area and is communicably connectable to another area adjacent to the multi-path passage area; and determining a third end-to-end path so that the third end-to-end path includes as a segment thereof the calculated alternative intra-area path, has the given bandwidth, and traverses a third sequence of passage areas that is selected among the plurality of areas and includes as a passage area thereof the another area adjacent to the multi-path passage area.

13. The method of claim 11, further comprising:

calculating, when there exists such a multi-path passage area in which the number of the calculated intra-area paths therein is less than the number of end-to-end paths passing therethrough, an alternative intra-area path that exists within the multi-path passage area and is communicably connectable to another area adjacent to the multi-path passage area; and determining a third end-to-end path so that the third end-to-end path includes as a segment thereof the alternative intra-area path, has the given bandwidth, and traverses a third sequence of passage areas that is selected among the plurality of areas and includes as a passage area thereof the another area adjacent to the multi-path passage area.

* * * * *